US012634857B2

(12) United States Patent
Liberg et al.

(10) Patent No.: US 12,634,857 B2
(45) Date of Patent: May 19, 2026

(54) SYSTEMS AND METHODS FOR SUPPORTING COHERENT TRANSMISSIONS IN A NON-TERRESTRIAL NETWORK

(71) Applicant: Telefonaktiebolaget LM Ericsson (publ), Stockholm (SE)

(72) Inventors: Olof Liberg, Enskede (SE); Stefan Eriksson Löwenmark, Färentuna (SE); Magnus Åström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 734 days.

(21) Appl. No.: 17/799,307

(22) PCT Filed: Feb. 10, 2021

(86) PCT No.: PCT/SE2021/050097
§ 371 (c)(1),
(2) Date: Aug. 12, 2022

(87) PCT Pub. No.: WO2021/162613
PCT Pub. Date: Aug. 19, 2021

(65) Prior Publication Data
US 2023/0113042 A1    Apr. 13, 2023

Related U.S. Application Data

(60) Provisional application No. 62/976,445, filed on Feb. 14, 2020.

(51) Int. Cl.
*H04W 24/02* (2009.01)
*H04B 7/01* (2006.01)
(Continued)

(52) U.S. Cl.
CPC .......... *H04W 56/0045* (2013.01); *H04B 7/01* (2013.01); *H04B 7/1851* (2013.01)

(58) Field of Classification Search
CPC .... H04W 56/0045; H04W 84/06; H04B 7/01; H04B 7/1851
(Continued)

(56) References Cited

U.S. PATENT DOCUMENTS

| | | | |
|---|---|---|---|
| 5,701,127 A | 12/1997 | Sharpe | |
| 6,114,992 A | 9/2000 | Underbrink | |

(Continued)

FOREIGN PATENT DOCUMENTS

| | | | | |
|---|---|---|---|---|
| CN | 107211451 A | * | 9/2017 | .......... H04W 72/046 |
| CN | 105474740 B | | 12/2019 | |

(Continued)

OTHER PUBLICATIONS

Author Unknown, "Technical Specification Group Radio Access Network; Study on New Radio (NR) to support non terrestrial networks (Release 15)," Technical Report 38.811, Version 1.0.0, Jun. 2018, 3GPP Organizational Partners, 136 pages.
(Continued)

*Primary Examiner* — Tanmay K Shah
(74) *Attorney, Agent, or Firm* — Withrow & Terranova, PLLC

(57) ABSTRACT

Systems and methods are disclosed herein for supporting coherent transmissions in a wireless network such as a Non-Terrestrial Network (NTN). In one embodiment, a method performed by a wireless communication device comprises starting an uplink transmission and performing one or more actions comprising creating a time gap within the uplink transmission and/or muting a portion of the uplink transmission to support a timing advance of the continued uplink transmission. The method further comprises performing time-frequency compensation during a time period created by performing the one or more actions and continuing the uplink transmission after performing the time-frequency (Continued)

compensation. In this manner, a low-complexity method for achieving a compensation for a time variant Doppler shift is provided. This offers a predictability that can be used in a wireless network such as, for example, an NTN for supporting coherent demodulation and optimized receiver implementations.

18 Claims, 17 Drawing Sheets

(51) Int. Cl.
  *H04B 7/185*   (2006.01)
  *H04W 56/00*   (2009.01)
(58) Field of Classification Search
  USPC ........................................................ 455/427
  See application file for complete search history.

(56) References Cited

U.S. PATENT DOCUMENTS

| | | | | |
|---|---|---|---|---|
| 6,181,911 | B1 * | 1/2001 | Sih | G01S 19/29 |
| | | | | 455/12.1 |
| 6,464,643 | B1 | 10/2002 | Brock-Fisher | |
| 6,529,485 | B1 | 3/2003 | Agarwal et al. | |
| 6,701,127 | B1 | 3/2004 | Wreschner et al. | |
| 7,283,091 | B1 | 10/2007 | Loomis | |
| 7,327,311 | B2 | 2/2008 | Dooley et al. | |
| 2002/0105457 | A1 | 8/2002 | Dooley et al. | |
| 2002/0105458 | A1 | 8/2002 | Dooley et al. | |
| 2003/0012293 | A1 | 1/2003 | Laurent et al. | |
| 2004/0082303 | A1 | 4/2004 | Giannakis et al. | |
| 2007/0058683 | A1 | 3/2007 | Futami et al. | |
| 2009/0303117 | A1 | 12/2009 | Boiero et al. | |
| 2010/0246720 | A1 | 9/2010 | Wang et al. | |
| 2011/0116386 | A1 | 5/2011 | Blanchard et al. | |
| 2011/0142115 | A1 | 6/2011 | Wang et al. | |
| 2014/0378084 | A1 | 12/2014 | Preteseille et al. | |
| 2016/0278033 | A1 | 9/2016 | Wu et al. | |
| 2017/0257862 | A1 | 9/2017 | Xue et al. | |
| 2017/0373907 | A1 | 12/2017 | Tan et al. | |
| 2018/0054800 | A1 | 2/2018 | Yeo et al. | |
| 2018/0205589 | A1 | 7/2018 | Bai et al. | |
| 2018/0330611 | A1 | 11/2018 | Jiang et al. | |
| 2019/0104522 | A1 | 4/2019 | Yoo et al. | |
| 2019/0215781 | A1 | 7/2019 | Jeon et al. | |
| 2019/0313357 | A1 | 10/2019 | Wang et al. | |
| 2019/0327762 | A1 | 10/2019 | Takeda et al. | |
| 2019/0380151 | A1 * | 12/2019 | Kim | H04L 5/0053 |
| 2019/0394738 | A1 | 12/2019 | Abedini et al. | |
| 2021/0297147 | A1 * | 9/2021 | Qaise | H04B 7/18539 |
| 2022/0046466 | A1 | 2/2022 | Sridhar et al. | |
| 2022/0078734 | A1 | 3/2022 | Zhang et al. | |

FOREIGN PATENT DOCUMENTS

| | | | |
|---|---|---|---|
| CN | 113630215 | A | 11/2021 |
| EP | 0848509 | A1 | 6/1998 |
| KR | 20180021628 | A | 3/2018 |
| WO | 0014568 | A1 | 3/2000 |
| WO | 2007044095 | A1 | 4/2007 |
| WO | 2013177578 | A1 | 11/2013 |
| WO | 2018160682 | A1 | 9/2018 |
| WO | 2019097855 | A1 | 5/2019 |
| WO | 2020031120 | A2 | 2/2020 |
| WO | 2020089471 | A1 | 5/2020 |
| WO | 2020165736 | A1 | 8/2020 |
| WO | 2021033085 | A1 | 2/2021 |

OTHER PUBLICATIONS

Author Unknown, "Technical Specification Group Radio Access Network; Study on New Radio (NR) to support hon terrestrial networks (Release 15)," Technical Report 38.811, Version 15.0.0, Jun. 2018, 3GPP Organizational Partners, 118 pages.
Author Unknown, "Technical Specification Group Radio Access Network; Solutions for NR to support non-terrestrial networks (NTN) (Release 16)," Technical Report 38.821, Version 16.0.0, Dec. 2019, 3GPP Organizational Partners, 140 pages.
Author Unknown, "Technical Specification Group Radio Access Network; Evolved Universal Terrestrial Radio Access (E-UTRA); Physical channels and modulation (Release 16)," Technical Specification 36.211, Version 16.0.0, Dec. 2019, 3GPP Organizational Partners, 245 pages.
Author Unknown, "Technical Specification Group Radio Access Network; Evolved Universal Terrestrial Radio Access (E-UTRA); Physical layer procedures (Release 16)," Technical Specification 36.213, Version 16.0.0, Dec. 2019, 3GPP Organizational Partners, 569 pages.
Ericsson, "R1-1912725: On NTN synchronization, random access, and timing advance," 3GPP TSG-RAN WG1 Meeting #99, Nov. 18-22, 2019, Reno, Nevada, 22 pages.
Ericsson, "R2-1907296: On random access procedures for NTN," 3GPP TSG-RAN WG2 #106, May 13-17, 2019, Reno, Nevada, 6 pages.
Mediatek Inc., "R1-1904644: Doppler compensation in initial access procedure in NR-NTN," 3GPP TSG RAN WG1 Meeting #96bis, Apr. 8-12, 2019, Xi'an, China, 5 pages.
Mediatek Inc., "RP-193235: New Study WID on NB-IoT/eTMC support for NTN, " 3GPP TSG RAN Meeting #86, Dec. 9-31, 2019, Sitges, Spain, 4 pages.
Sony, "R1-1906829: Discussion on physical layer control procedures," 3GPP TSG RAN WG1 #97, May 13-17, 2019, Reno, Nevada, 4 pages.
Thales, et al., "RP-171450: Study on NR to support Non-Terrestrial Networks," 3GPP TSG RAN WG1 Meeting 88bis, West Palm Beach, Florida, Jun. 5-9, 2017, 5 pages.
Thales, "RP-181370: Study on solutions evaluation for NR to support Non Terrestrial Network," 3GPP TSG RAN meeting #80, Jun. 11-14, 2018, La Jolla, California, 5 pages.
Thales, "RP-193234: Solutions for NR to support non-terrestrial networks (NTN)," 3GPP TSG RAN meeting #86, Dec. 9-13, 2019, Sitges, Spain, 10 pages.
International Search Report and Written Opinion for International Patent Application No. PCT/SE2021/050097, mailed May 14, 2021, 18 pages.
International Search Report and Written Opinion for International Patent Application No. PCT/IB2020/057596, mailed Dec. 11, 2020, 15 pages.
Ericsson, "R1-1909107: On frequency compensation, uplink timing and random access in NTN," 3GPP TSG-RAN WG1 Meeting #98, Aug. 26-30, 2019, Prague, Czech Republic, 19 pages.
Ericsson, "R1-2005502: On UL time and frequency synchronization enhancements for NTN," 3GPP TSG-RAN WG1 Meeting #102-e, Aug. 17-28, 2020, Electronic Meeting, 14 pages.
Huawei, et al., "R1-1905994: Discussion on timing advance and RACH for NTN," 3GPP TSG RAN WG1 Meeting #97, May 13-17, 2019, Reno, Nevada, 10 pages.
Nokia, et al., "R1-1913017: Doppler Compensation, Uplink Timing Advance and Random Access in NTN," 3GPP TSG RAN WG1 Meeting #99, Nov. 18-22, 2019, Reno, Nevada, 28 pages.
OPPO, "R1-1908984: Ntn operation for Doppler and Timing Advance," 3GPP TSG RAN WG1 #98, Aug. 26-30, 2019, Prague, Czech Republic, 4 pages.
OPPO, "R2-1909753: Discussion on timing advance in NTN RACH," 3GPP TSG-RAN WG2 Meeting #107, Aug. 26-30, 2019, Prague, Czech Republic, 3 pages.
Thales, "RP-180543: NR-NTN: NR impact area identification, initial downlink synchronisation," 3GPP TSG RAN Meeting #79, Mar. 19-23, 2018, Chennai, India, 7 pages.
ZTE Corporation, et al., "R2-1911768: TP on Random Access for UE with location information," 3GPP TSG-RAN WG2 Meeting #107, Aug. 26-30, 2019, Prague, Czech Republic, 16 pages.
First Office Action for Chinese Patent Application No. 202180028616. 8, mailed Apr. 30, 2025, 11 pages.

(56)         References Cited

OTHER PUBLICATIONS

Examination Report for European Patent Application No. 21706052.
4, mailed Jan. 3, 2025, 6 pages.

\* cited by examiner

SYSTEMS AND METHODS FOR SUPPORTING COHERENT TRANSMISSIONS IN A NON-TERRESTRIAL NETWORK

RELATED APPLICATIONS

This application is a 35 U.S.C. § 371 national phase filing of International Application No. PCT/SE2021/050097, filed Feb. 10, 2021, which claims the benefit of provisional patent application Ser. No. 62/976,445, filed Feb. 14, 2020, the disclosures of which are hereby incorporated herein by reference in their entireties.

TECHNICAL FIELD

The present disclosure relates to coherent transmissions in a wireless network and, in particular, in a non-terrestrial network.

BACKGROUND

In Third Generation Partnership Project (3GPP) Release 8, the Evolved Packet System (EPS) was specified. EPS is based on the Long Term Evolution (LTE) radio network and the Evolved Packet Core (EPC). It was originally intended to provide voice and Mobile Broadband (MBB) services, but has continuously evolved to broaden its functionality. Since Release 13, Narrowband Internet of Things (NB-IoT) and LTE for Machine Type Communication (MTC) (LTE-M) are part of the LTE specifications and provide connectivity to massive Machine Type Communication (mMTC) services.

In 3GPP Release 15, the first release of the Fifth Generation (5G) System (5GS) was specified. This is a new generation's Radio Access Technology (RAT) intended to serve use cases such as enhanced Mobile Broadband (eMBB), Ultra-Reliable and Low Latency Communication (URLLC), and mMTC. The 5GS includes the New Radio (NR) access stratum interface and the 5G Core Network (5GC). The NR physical and higher layers reuse parts of the LTE specification, and to that add needed components when motivated by new use cases. One such component is the introduction of a sophisticated framework for beam forming and beam management to extend the support of the 3GPP technologies to a frequency range going beyond 6 Gigahertz (GHz).

In Release 15, 3GPP started the work to prepare NR for operation in a Non-Terrestrial Network (NTN). The work was performed within the study item "NR to support Non-Terrestrial Networks" and resulted in 3GPP Technical Report (TR) 38.811 [1]. In Release 16, the work to prepare NR for operation in an NTN network continued with the study item "Solutions for NR to support Non-Terrestrial Network" [2]. In parallel, the interest to adapt NB-IoT and LTE-M for operation in NTN is growing. As a consequence, 3GPP Release 17 contains both a work item on NR NTN [3] and a study item on NB-IoT and LTE-M support for NTN [4].

The next sections provide a brief background description of some topics that are relevant to the systems and methods disclosed herein.

Satellite Communications

A satellite Radio Access Network (RAN) is one type of NTN. A satellite RAN usually includes the following components:

- a satellite that refers to a space-borne platform;
- an earth-based gateway that connects the satellite to a base station or a core network, depending on the choice of architecture;
- a feeder link that refers to the link between a gateway and a satellite; and
- a service link that refers to the link between a satellite and a User Equipment (UE).

Depending on the orbit altitude, a satellite may be categorized as a Low Earth Orbit (LEO), Medium Earth Orbit (MEO), or Geostationary Earth Orbit (GEO) satellite:

- LEO: typical heights ranging from 250-1,500 kilometers (km), with orbital periods ranging from 90-120 minutes,
- MEO: typical heights ranging from 5,000-25,000 km, with orbital periods ranging from 3-15 hours, and
- GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

FIG. 1 shows an example architecture of a satellite network with bent pipe transponders. Bent pipe transponders practically mean that the feeder link signal is repeated on the service link. The depicted elevation angle of the service link is important as it determines the distance between the satellite and the device, and the velocity of the satellite relative to the device.

In a LEO NTN, the satellites are moving with a velocity of approximately 7.1 kilometers per second (km/s). This leads to relativistic effects, including a Doppler shift of the carrier frequency on the service link of up to 24 parts per million (ppm) (e.g., of the carrier frequency) for a LEO satellite at 600 km altitude [2]. The Doppler shift is also time variant due to the satellite motion over the sky. The Doppler shift may vary with up to 0.27 ppm per second (ppm/s) for a LEO satellite at 600 km altitude. The Doppler shift will impact, i.e. increase or decrease, the frequency received on the service link compared to the transmitted frequency. Also, the service link timing will be impacted by the Doppler shift. In case the satellite moves towards the receiver, an increase in the observed frequency will be experienced, and time will appear to run faster in the receiver compared to the transmitter.

Synchronization

An LTE/NB-IoT/NR UE utilizes the broadcast synchronization sequences (Primary Synchronization Signal (PSS)/Secondary Synchronization Signal (SSS)) to estimate the downlink (DL) frequency from a base station. The estimated frequency is used as a reference based on which it adjusts its time and frequency reference that determines both DL (receive) and uplink (UL) (transmit) frequency.

Due to the Doppler shift described above, the local frequency reference $f_{Ref,UE}$ in the UE will, during initial DL synchronization, be tuned to a frequency $f_{RX,UE}$ that has an offset $f_{Doppler,DL}$ relative to the ideal frequency (i.e., the satellite DL transmit frequency $f_{IDEAL,DL}$):

$$f_{Ref,UE} = f_{RX,UE} = f_{IDEAL,DL} + f_{Doppler,DL}$$

The local frequency reference is used both to determine the receive (RX) and transmit (TX) frequency of the UE. In the simplest case of a Time Division Duplexing (TDD) network, the intended DL and UL frequencies, i.e. $f_{IDEAL,DL}$ and $f_{IDEAL,UL}$, are even identical:

$$f_{IDEAL} = f_{IDEAL,DL} = f_{IDEAL,UL}$$

For simplicity, let us continue to consider a TDD network. When the UE accesses the network on the Physical Random Access Channel (PRACH), its transmit frequency $f_{TX\_RA,UE}$ will therefore have an offset corresponding to the DL Doppler:

$$f_{TX\_RA,UE} = f_{Ref,UE} = f_{IDEAL} + f_{Doppler,DL}$$

Due to further Doppler shift in UL, $f_{Doppler,UL}$, the received signal on the network side will have a total frequency offset of $f_{Doppler,DL} + f_{Doppler,UL}$ compared to the ideal frequency:

$$f_{RX,NW} = f_{TX\_RA,UE} + f_{Doppler,UL} = f_{IDEAL} + f_{Doppler,DL} + f_{Doppler,UL}$$

If closed-loop Doppler compensation is used, the network may estimate the Doppler shift based, e.g., on the reception of the PRACH. It then communicates the offset f $(f_{Doppler,DL} + f_{Doppler,UL})$ to the UE, e.g. in the Random Access Response (RAR) message. The UE adjusts its UL transmit frequency in subsequent transmissions by $-(f_{Doppler,DL} + f_{Doppler,UL})$ to $f_{TX,UE}$, thereby cancelling the frequency offset of the received UL signal on the network (NW) side:

$$f_{TX,UE} = f_{Ref,UE} - (f_{Doppler,DL} + f_{Doppler,UL})$$

$$f_{RX,NW} = f_{TX,UE} + f_{Doppler,UL} = f_{Ref,UE} - (f_{Doppler,DL} + f_{Doppler,UL}) + f_{Doppler,UL}$$

$$= f_{IDEAL} + f_{Doppler,DL} - (f_{Doppler,DL} + f_{Doppler,UL}) + f_{Doppler,UL} = f_{IDEAL}$$

Since the UL and DL Doppler shift are the same in a TDD system, the adjustment in the UL TX signal frequency relative to the received DL signal frequency can be expressed as $-2f_{Doppler}$, or in relative numbers as $-f_{Doppler}/f_{IDEAL}$.

In the above calculations, a static Doppler shift has been assumed. In reality, the Doppler shift $f_{Doppler}$ is time variant, and this time variation in the Doppler shift $f_{Doppler}$ needs to be accounted for once the UE enters Radio Resource Control (RRC) connected mode. In [5], it is shown that the Doppler drift rate can be predicted and compensated for by a UE during transmission in an NTN.

Although the compensation was here described for a TDD NTN, a similar approach can be taken for a Frequency Division Duplexing (FDD) NTN.

Uplink Timing

The description in the previous section focused on the frequency offset induced by a constant Doppler shift, but the relativistic effects will also be seen in the time domain. A UE should therefore also adjust the UL timing resolution, i.e. the sampling rate, along with the UL transmit frequency. For a TDD system, described in the previous section, the UL timing resolution should be adjusted by a factor $1/(1-2f_{Doppler}/f_{IDEAL})$ relative to the UE's DL timing resolution or by a factor $\Delta = 1/(1-f_{Doppler}/f_{IDEAL})$, relative to the timing resolution used in the satellite.

To further exemplify the timing correction in the UE, FIG. 2 illustrates how a UE can adjust its UL transmission timing resolution to compensate for a time drift induced on the UE to satellite link of relative magnitude Δ. More specifically, FIG. 2 illustrates a scenario where a UE transmits in the UL to a satellite which is moving away from the UE at an approximately constant velocity $v_y$ relative to the UE. The movement away from the transmitting UE results in the satellite receiver experiencing a reduced carrier frequency relative to the UE transmit frequency due to the Doppler shift $f_{Doppler}$ being negative. For the satellite to receive the signal at a correct timing corresponding to a time resolution, or sample rate, of $t_s$ then the UE needs to apply the mentioned compensation factor Δ to its transmit timing. Since $f_{Doppler}$ is negative in this example, this results in Δ<1 and a reduced UE transmit time resolution $\Delta \cdot t_s$ relative that used in the satellite. If the UL timing resolution is not adjusted by this amount, the UL signal received by the base station receiver will drift in time.

Currently, a NR network sends Timing Advance (TA) commands to a UE in connected mode to maintain UL timing. There are six (6) bits in the Medium Access Control (MAC) control element (MAC-CE) for indicating an index $T_A$, where $T_A \in \{0,1,\ldots,63\}$, to the UE. The UE calculates the new TA value $N_{TA\_new}$ using $N_{TA\_new} = N_{TA\_old} + (T_A - 31) \times 16 \times 64 \times 2^{-\mu}$ (in units of $T_c$ where $T_c = 0.509$ ns), where $15 \cdot 2^\mu$ kilohertz (kHz) is the Subcarrier Spacing (SCS) and $\mu \in \{0, 1,2,3\}$. This allows a maximum change in the TA value of $32 \times 16 \times 64 \times 2^{-\mu} T_c$ which is shown in the following table. To cope with a large timing drift of say 40 μs/s, several such commands per second are required.

TABLE 1

| Maximum change in TA value in connected mode for various SCS. | | | |
|---|---|---|---|
| SCS | 15 kHz | 30 kHz | 60 kHz | 120 kHz |
| Max. change in TA | 16.67 μs | 8.33 μs | 4.16 μs | 2.08 μs |

For NR, it has been noticed that relying solely on TA update commands to deal with timing drift will lead to excessive signaling overhead. Due to this reason, it was proposed in [5] that the network should signal the estimated initial Doppler shift and Doppler change rate to a UE to allow a UE to autonomously adjust its UL timing to take timing drift due to Doppler into account (this timing drift may also be referred to as time dilation). In [2], it is also proposed that a UE may adjust its UL timing based on timing drift information signaled from the network to the UE.

Coherent Transmissions

In Release 13, 3GPP specified NB-IoT, and support for LTE-M including Bandwidth-reduced Low-complexity (BL) UEs operating in Coverage Enhanced (CE) modes A and B. The LTE BL/CE mode operation is hereafter referred to as LTE-M operation. NB-IoT and LTE-M are designed to provide qualities such as deep indoor coverage, high system capacity, and long device battery life.

NB-IoT, LTE-M, and other RATs use time repetitions of radio blocks for improving coverage and reliability. NB-IoT does, for example, in the most extreme case support up to 128 consecutive time repetitions of the Narrowband Physical Uplink Shared Channel (NPUSCH) transmitted over up to four (4) seconds. In the 3GPP specifications, this concept is referred to as 'blind repetitions' or just 'repetitions'. This type of repetitions is transmitted without awaiting feedback from the receiving node, which explains why the concept in some cases is referred to as blind repetitions.

The receiving node can assume that the transmitting node for any given antenna port provides a coherent waveform. This allows the receiver to infer the channel over which a symbol on the antenna port is conveyed from "the channel over which another symbol on the same antenna port is conveyed" [6]. This means that the transmitter presents to the receiver a well-defined time and frequency reference meeting tight requirements on maintaining a constant reference frequency and a continuous phase trajectory.

Equation 1 illustrates a simple example of a signal s defined for a sample rate $t_s$ over N samples that meets the coherency requirements thanks to its time-invariant carrier frequency $f_c$ and phase $\rho_c$:

$$s(nt_s)=\sin(2\pi f_c nt_s+\rho_c), n=0, \ldots N-1 \qquad \text{(Eq 1)}$$

In addition to this, the 3GPP baseband specifications provide, for each repeated radio block, a well-defined starting point $t_0$ and length Tin time, and a specified starting phase $\rho_o$.

At the receiver, the repeated blocks are typically combined to improve the receiver processing gain. The well specified transmitter requirements allow the receiver to adapt and optimize the receive combining method. The optimal combining scheme is typically dependent on the radio technology. In case of NB-IoT and LTE-M, a popular combining method is to jointly estimate the radio channel for a set of consecutive radio blocks. This allows the receiver to improve the channel estimate and optimize the coherent demodulation performance across a set of repeated radio blocks.

If the above-mentioned transmitter coherency requirements are not assumed to be fulfilled, the receiving node must revert to a less efficient combining method. For NB-IoT and LTE-M, the receiver will perform channel estimation on a per received radio block basis.

SUMMARY

Systems and methods are disclosed herein for supporting coherent transmissions in a wireless network such as a Non-Terrestrial Network (NTN). In one embodiment, a method performed by a wireless communication device comprises starting an uplink transmission and performing one or more actions comprising creating a time gap within the uplink transmission and/or muting a portion of the uplink transmission to support a Timing Advance (TA) of the continued uplink transmission. The method further comprises performing time-frequency compensation during a time period created by performing the one or more actions and continuing the uplink transmission after performing the time-frequency compensation. In this manner, a low-complexity method for achieving a compensation for a time variant Doppler shift is provided. This offers a predictability that can be used in a wireless network such as, for example, an NTN for supporting coherent demodulation and optimized receiver implementations.

In one embodiment, performing the time-frequency compensation comprises performing the time-frequency compensation such that a time compensation, a frequency compensation, or both a time compensation and a frequency compensation is applied at the wireless communication device during the time period created by performing the action.

In one embodiment, the uplink transmission comprises a plurality of consecutive repetitions of a base transmission. In another embodiment, the uplink transmission consists of a plurality of consecutive repetitions of a base transmission. In one embodiment, the uplink transmission is a Narrowband Internet of Things (NB-IoT) or Long Term Evolution (LTE) for Machine Type Communication (MTC) (LTE-M) uplink transmission that comprises a plurality of consecutive repetitions of a base transmission. In another embodiment, the uplink transmission is an NB-IoT or LTE-M uplink transmission that consists of a plurality of consecutive repetitions of a base transmission. In one embodiment, the base transmission is a Narrowband Physical Uplink Shared Channel (NPUSCH). In another embodiment, the base transmission is a Physical Uplink Shared Channel (PUSCH).

In one embodiment, performing the one or more actions comprises creating a time gap within the uplink transmission. In one embodiment, creating the time gap within the uplink transmission comprises creating the time gap within a Transmission Time Interval (TTI) of the uplink transmission. In one embodiment, the TTI has a length of greater than 1 subframe, greater than 1 radio frame, greater than 1 millisecond (ms), greater than 10 ms, or greater than 1 second.

In one embodiment, performing the time-frequency compensation comprises: (a) performing one or more actions to compensate for an estimated Doppler shift related to the uplink transmission, (b) performing one or more actions to compensate for an estimated time dilation related to the uplink transmission, or (c) both (a) and (b).

In one embodiment, performing the time-frequency compensation comprises: (a) performing one or more actions to compensate for an estimated Doppler shift caused by motion of a satellite of a satellite-based Radio Access Network (RAN) which is to receive the uplink transmission, (b) performing one or more actions to compensate for an estimated time dilation caused by motion of a satellite of a satellite-based RAN which is to receive the uplink transmission, or (c) both (a) and (b).

In one embodiment, performing the time-frequency compensation comprises adjusting a transmit frequency of the continued uplink transmission. In one embodiment, the adjusting of the transmit frequency is performed to compensate for an estimated Doppler shift or estimated change in Doppler shift related to the uplink transmission.

In one embodiment, performing the time-frequency compensation comprises adjusting a time resolution, sampling rate, or both the time resolution and the sample rate of the continued uplink transmission. In one embodiment, the adjusting of the time resolution, the sampling rate, or both the time resolution and the sampling rate is performed to compensate for an estimated time dilation or estimated change in time dilation related to the uplink transmission. In one embodiment, the adjusting of the time resolution, the sampling rate, or both the time resolution and the sampling rate stretches or compresses the continued transmission in the time domain.

In one embodiment, performing the time-frequency compensation comprises adjusting an uplink transmit timing of the wireless communication device. In one embodiment, the adjusting of the uplink transmit timing is performed to compensate for an estimated time dilation or estimated change in time dilation related to the uplink transmission.

In one embodiment, performing the time-frequency compensation comprises shifting a starting point for a remainder of the uplink transmission that is transmitted by continuing the uplink transmission. In one embodiment, the shifting of the starting point is performed to compensate for an estimated time dilation or estimated change in time dilation related to the uplink transmission.

In one embodiment, the method further comprises receiving a configuration of one or more parameters from a network node, the one or more parameters defining a location(s) of time gap(s) to be created in the uplink transmission or one or more values to be used by the wireless communication device to derive the location(s) of the time gap(s) to be created in the uplink transmission.

In one embodiment, the method further comprises receiving a configuration of one or more parameters from a network node, the one or more parameters defining when to perform the time-frequency compensation or one or more values to be used by the wireless communication device to derive when to perform the time-frequency compensation.

In one embodiment, creating the time gap comprises delaying a portion of the uplink transmission, muting a portion of the uplink transmission, puncturing a portion of the uplink transmission, dropping one or more symbols of the uplink transmission, not using one or more symbols of the uplink transmission, and/or leaving one or more symbols of the uplink transmission blank.

In one embodiment, the locations of the one or more time gaps are based on satellite ephemeris and/or a Cyclic Prefix (CP) duration.

Corresponding embodiments of a wireless communication device are also disclosed. In one embodiment, a wireless communication device is adapted to start an uplink transmission and perform one or more actions comprising creating a time gap within the uplink transmission and/or muting a portion of the uplink transmission to support a TA of the continued uplink transmission. The wireless communication device is further adapted to perform time-frequency compensation during a time period created by performing the one or more actions and continue the uplink transmission after performing the time-frequency compensation.

In another embodiment, a wireless communication device comprises one or more transmitters, one or more receivers, and processing circuitry associated with the one or more transmitters and the one or more receivers. The processing circuitry is configured to cause the wireless communication device to start an uplink transmission and perform one or more actions comprising creating a time gap within the uplink transmission and/or muting a portion of the uplink transmission to support a TA of the continued uplink transmission. The processing circuitry is further configured to cause the wireless communication device to perform time-frequency compensation during a time period created by performing the one or more actions and continue the uplink transmission after performing the time-frequency compensation.

Embodiments of a computer program are also disclosed. In one embodiment, a computer program is provided which, when executed on at least one processor, cause the at least one processor to carry out the method of operation of a wireless communication device according to any of the embodiments disclosed herein. In one embodiment, a carrier containing the computer program is provided, wherein the carrier is one of an electronic signal, an optical signal, a radio signal, or a computer readable storage medium.

In another embodiment, a non-transitory computer readable medium is provided. The non-transitory computer readable medium stores instructions executable by processing circuitry of a wireless communication device whereby the wireless communication device is operable to start an uplink transmission and perform one or more actions comprising creating a time gap within the uplink transmission and/or muting a portion of the uplink transmission to support a TA of the continued uplink transmission. Via execution of the instructions by the processing circuitry, the wireless communication device is further operable to perform time-frequency compensation during a time period created by performing the one or more actions and continue the uplink transmission after performing the time-frequency compensation.

Embodiments of a method performed by a network node are also disclosed. In one embodiment, a method performed by a network node comprises configuring a wireless communication device with one or more parameters. In one embodiment, the one or more parameters either: (a) define locations of one or more time gaps to be used by the wireless communication device to perform time-frequency compensation during an uplink transmission or locations of one or more portions of the uplink transmission to be muted to perform time-frequency compensation or (b) define one or more values to be used by the wireless communication device to derive the locations of the one or more time gaps to be used by the wireless communication device to perform time-frequency compensation during the uplink transmission or locations of one or more portions of the uplink transmission to be muted to perform time-frequency compensation. In another embodiment, the one or more parameters either: (a) define when to perform the time-frequency compensation during an uplink transmission or (b) define one or more values to be used by the wireless communication device to derive when to perform time-frequency compensation during an uplink transmission.

In one embodiment, the uplink transmission comprises a plurality of consecutive repetitions of a base transmission. In another embodiment, the uplink transmission consists of a plurality of consecutive repetitions of a base transmission. In one embodiment, the uplink transmission is an NB-IoT or LTE-M uplink transmission that comprises a plurality of consecutive repetitions of a base transmission. In another embodiment, the uplink transmission is an NB-IoT or LTE-M uplink transmission that consists of a plurality of consecutive repetitions of a base transmission. In one embodiment, the base transmission is a NPUSCH. In another embodiment, the base transmission is a PUSCH.

In one embodiment, the one or more time gaps are created within a TTI of the uplink transmission. In one embodiment, the TTI has a length of greater than 1 subframe, greater than 1 radio frame, greater than 1 ms, greater than 10 ms, or greater than 1 second.

In one embodiment, the locations of the one or more time gaps are based on satellite ephemeris and/or a CP duration, or one or more locations in time for when the time-frequency compensation is to be performed by the wireless communication device are based on satellite ephemeris and/or a CP duration.

Corresponding embodiments of a network node are also disclosed. In one embodiment, a network node is adapted to configure a wireless communication device with one or more parameters. In one embodiment, the one or more parameters either: (a) define locations of one or more time gaps to be used by the wireless communication device to perform time-frequency compensation during an uplink transmission or locations of one or more portions of the uplink transmission to be muted to perform time-frequency compensation or (b) define one or more values to be used by the wireless communication device to derive the locations of the one or more time gaps to be used by the wireless communication device to perform time-frequency compensation during the uplink transmission or locations of one or more portions of the uplink transmission to be muted to perform time-frequency compensation. In another embodiment, the one or more parameters either: (a) define when to perform the time-frequency compensation during an uplink transmission or (b) define one or more values to be used by the wireless communication device to derive when to perform time-frequency compensation during an uplink transmission.

In one embodiment, a network node is adapted to configure a wireless communication device with one or more parameters. In one embodiment, the one or more parameters either: (a) define when to perform the time-frequency compensation during an uplink transmission or (b) define one or more values to be used by the wireless communication device to derive when to perform time-frequency compensation during an uplink transmission.

In one embodiment, a network node comprises processing circuitry configured to cause the network node to configure a wireless communication device with one or more parameters. In one embodiment, the one or more parameters either: (a) define locations of one or more time gaps to be used by the wireless communication device to perform time-frequency compensation during an uplink transmission or locations of one or more portions of the uplink transmission to be muted to perform time-frequency compensation or (b) define one or more values to be used by the wireless communication device to derive the locations of the one or more time gaps to be used by the wireless communication device to perform time-frequency compensation during the uplink transmission or locations of one or more portions of the uplink transmission to be muted to perform time-frequency compensation. In another embodiment, the one or more parameters either: (a) define when to perform the time-frequency compensation during an uplink transmission or (b) define one or more values to be used by the wireless communication device to derive when to perform time-frequency compensation during an uplink transmission.

In one embodiment, a network node comprises processing circuitry configured to cause the network node to configure a wireless communication device with one or more parameters. In one embodiment, the one or more parameters either: (a) define when to perform the time-frequency compensation during an uplink transmission or (b) define one or more values to be used by the wireless communication device to derive when to perform time-frequency compensation during an uplink transmission.

Embodiments of a computer program are also disclosed. In one embodiment, a computer program comprises instructions which, when executed on at least one processor, cause the at least one processor to carry out the method of operation of a network node according to any of the embodiments described herein. In one embodiment, a carrier containing the computer program is provided, wherein the carrier is one of an electronic signal, an optical signal, a radio signal, or a computer readable storage medium.

In one embodiment, a non-transitory computer readable medium is provided. The non-transitory computer readable medium comprises instructions executable by processing circuitry of a network node whereby the network node is operable to configure a wireless communication device with one or more parameters. In one embodiment, the one or more parameters either: (a) define locations of one or more time gaps to be used by the wireless communication device to perform time-frequency compensation during an uplink transmission or locations of one or more portions of the uplink transmission to be muted to perform time-frequency compensation or (b) define one or more values to be used by the wireless communication device to derive the locations of the one or more time gaps to be used by the wireless communication device to perform time-frequency compensation during the uplink transmission or locations of one or more portions of the uplink transmission to be muted to perform time-frequency compensation. In another embodiment, the one or more parameters that either: (a) define when to perform the time-frequency compensation during an uplink transmission or (b) define one or more values to be used by the wireless communication device to derive when to perform time-frequency compensation during an uplink transmission.

In one embodiment, a non-transitory computer readable medium is provided. The non-transitory computer readable medium comprises instructions executable by processing circuitry of a network node whereby the network node is operable to configure a wireless communication device with one or more parameters. In one embodiment, the one or more parameters either: (a) define when to perform the time-frequency compensation during an uplink transmission or (b) define one or more values to be used by the wireless communication device to derive when to perform time-frequency compensation during an uplink transmission.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
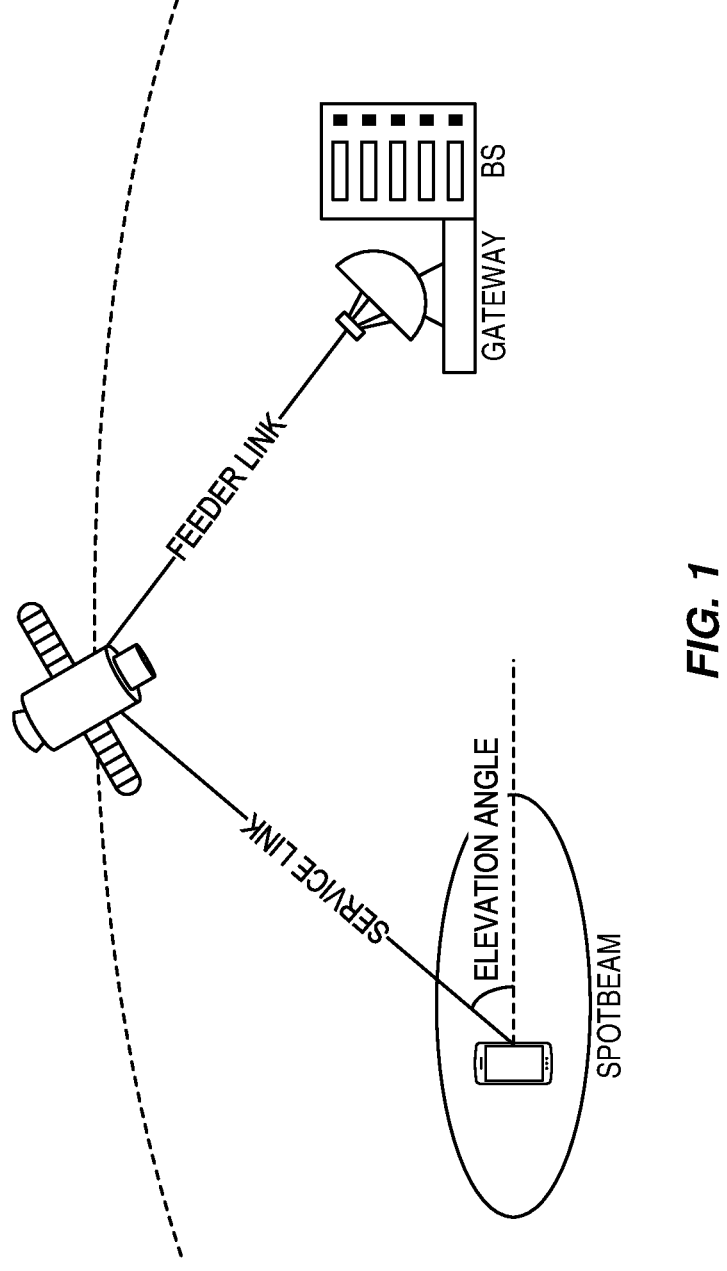
FIG. 1 shows an example architecture of a satellite network with bent pipe transponders.
Figure 2:
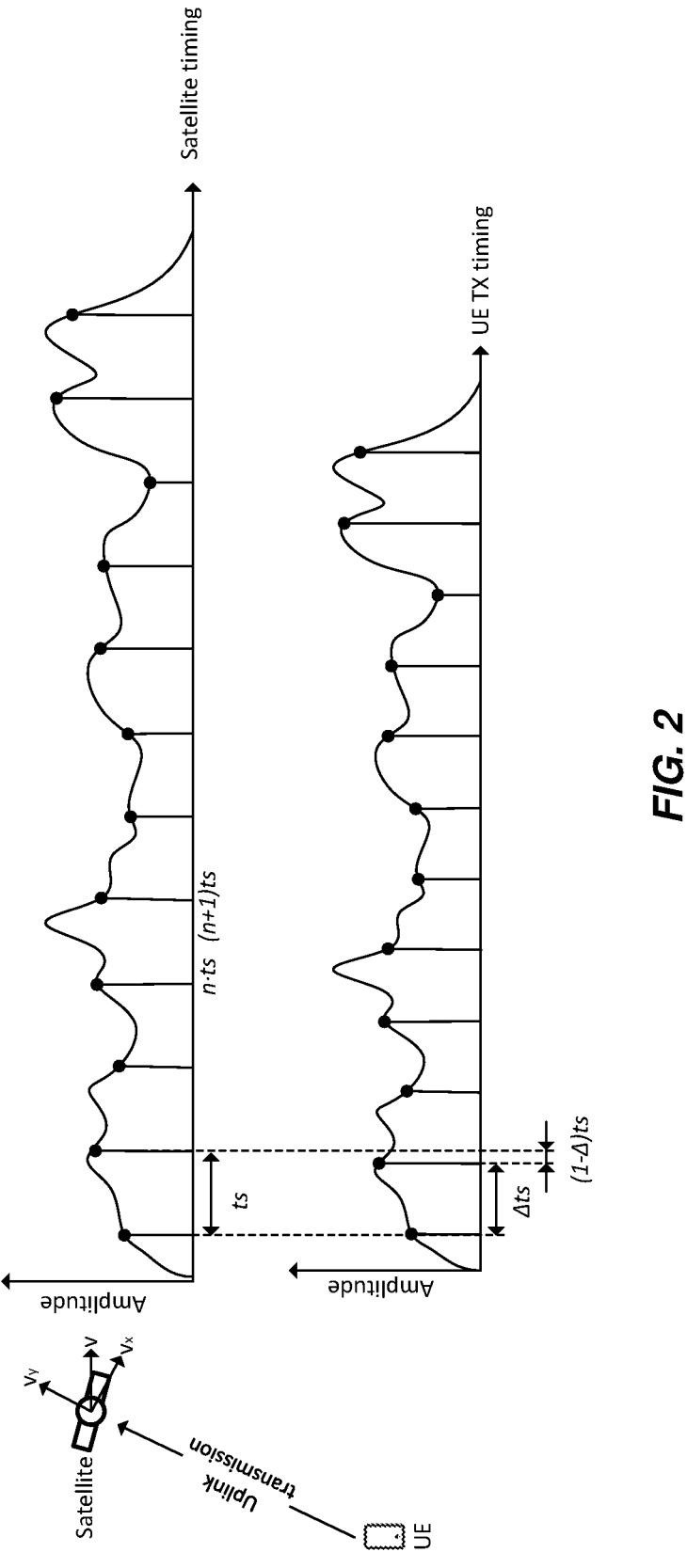
FIG. 2 illustrates how a User Equipment (UE) can adjust its uplink (UL) transmission timing resolution to compensate for a time drift induced on the UE to a satellite link of relative magnitude $\Delta$.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node. In the context of an NTN, a radio access node, e.g. a base station, can be fully or partly integrated in a satellite or in a gateway.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) in a Non-Terrestrial Network (NTN) when it comes to providing a coherent wave form over the service link due to the Doppler shift observed for Low Earth Orbit (LEO) satellites. In [5], it is proposed to allow a UE to autonomously adjust its transmission timing and transmission frequency to continuously compensate for the time variant Doppler shift experienced in a LEO NTN. To support long Transmission Time Intervals (TTI s) in Narrowband Internet of Things (NB-IoT) and LTE for MTC (LTE-M), this self-adjustment is a vital proposal to present a coherent waveform to the NTN base station receiver. The ability of a UE to continuously adjusting its time and frequency reference may, however, be dependent on the UE implementation and the magnitude of the Doppler shift, and may be difficult to achieve in low-complexity UE implementations.

Certain aspects of the present disclosure and their embodiments may provide solutions to the aforementioned or other challenges. The present disclosure provides systems and methods for adapting uplink (UL) transmission formats in an NTN to secure that the transmissions are coherent. This is of special relevance for NB-IoT and LTE-M where coherent transmissions over long TT's are used to improve the coverage. In this disclosure, systems and methods are disclosed for determining how a UE should correct its UL time and/or frequency reference during extended UL transmissions to compensate for the time variant Doppler shift present in LEO and Medium Earth Orbit (MEO) NTNs.

Embodiments are disclosed herein for providing a low-complexity method for performing UL time-frequency corrections for Doppler compensation in an NTN in a manner that allows the base station to optimize its receiver implementation.

Certain embodiments may provide one or more of the following technical advantage(s). Embodiments of the systems and methods disclosed herein support well-defined low-complexity methods for achieving a compensation for a time variant Doppler shift. This offers a predictability that can be used in an NTN for supporting coherent demodulation and optimized receiver implementations. Coherent demodulation means that the receiver knows (or has estimated) the channel (i.e., its strength (or gain) and phase) and can compensate for it.

Figure 3:
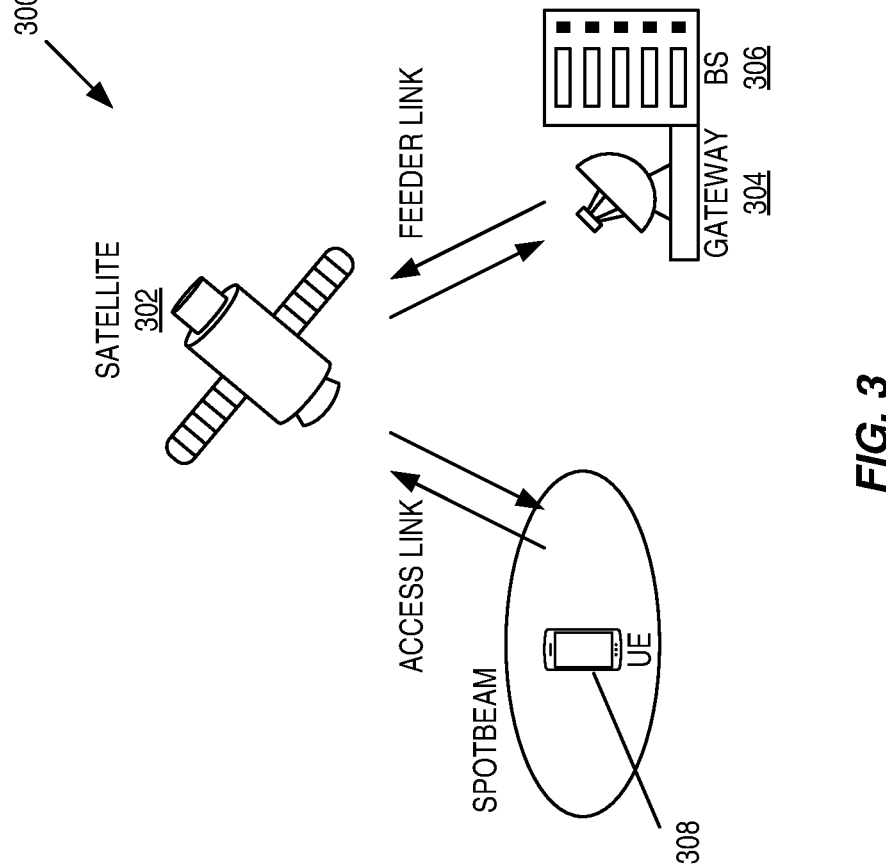
FIG. 3 illustrates one example of a wireless communication system in which embodiments of the present disclosure may be implemented.

FIG. 3 illustrates one example of a wireless communication system 300 in which embodiments of the present disclosure may be implemented. As illustrated, the wireless communication system 300 includes a satellite-based RAN, which includes a satellite 302 (i.e., a space or airborne radio access node or platform) and one or more gateways 304 that interconnect the satellite 302 to a land-based base station component 306. The functionality of a base station described herein may be implemented in the satellite 302 or distributed between the satellite 302 and the land-based base station component 306 (e.g., the satellite 302 may implement L1 functionality and the land-based base station component 306 may implement L2 and L3 functionality). In this example, a UE 308 communicates with the satellite RAN via the satellite 302. The UE 308 is one example of a wireless communication device. Note that the wireless communication system 300 is only one example of a wireless communication system that utilizes an NTN for radio access. The embodiments disclosed here are equally applicable to any such system.

Now, a description of some example embodiments of the present disclosure is provided. In the following set of embodiments, it is assumed that a UE (e.g., the UE 308) is supported by one or more time-frequency references. One reference frequency $f_s$ determines the time resolution, i.e. the sample rate, of the signal in the transmitter to $t_s=1/f_s$. One reference frequency $f_c$ determines the UL transmit frequency, i.e., the carrier frequency on which the transmit signal is modulated. The mentioned two time-frequency references may be generated by the same time-frequency source, or by individual time-frequency sources. A time-frequency source may, e.g., be defined by a local oscillator.

In regard to compensation of time-frequency references, in one embodiment, the UE continuously adjusts its UL transmit frequency during a TTI to compensate for an estimated time variant Doppler shift, e.g. caused by the satellite velocity.

In one embodiment, the UE adapts its UL transmit frequency at specified time intervals during a TTI to compensate for an estimated time variant Doppler shift, e.g. caused by the satellite velocity.

In one embodiment, the adjustment of the UL transmit timing for compensating for the time dilation caused by the satellite velocity is implemented as an adjustment of the signal sample rate $t_s$. For a signal TTI defined by k symbols, each of N samples, this adjustment will prolong or decrease the length $t_s \cdot N$ of each symbol. It will also progressively delay or advance the start of each symbol. The signal sample rate may be adjusted continuously or at specified time intervals within the TTI.

Figure 4:
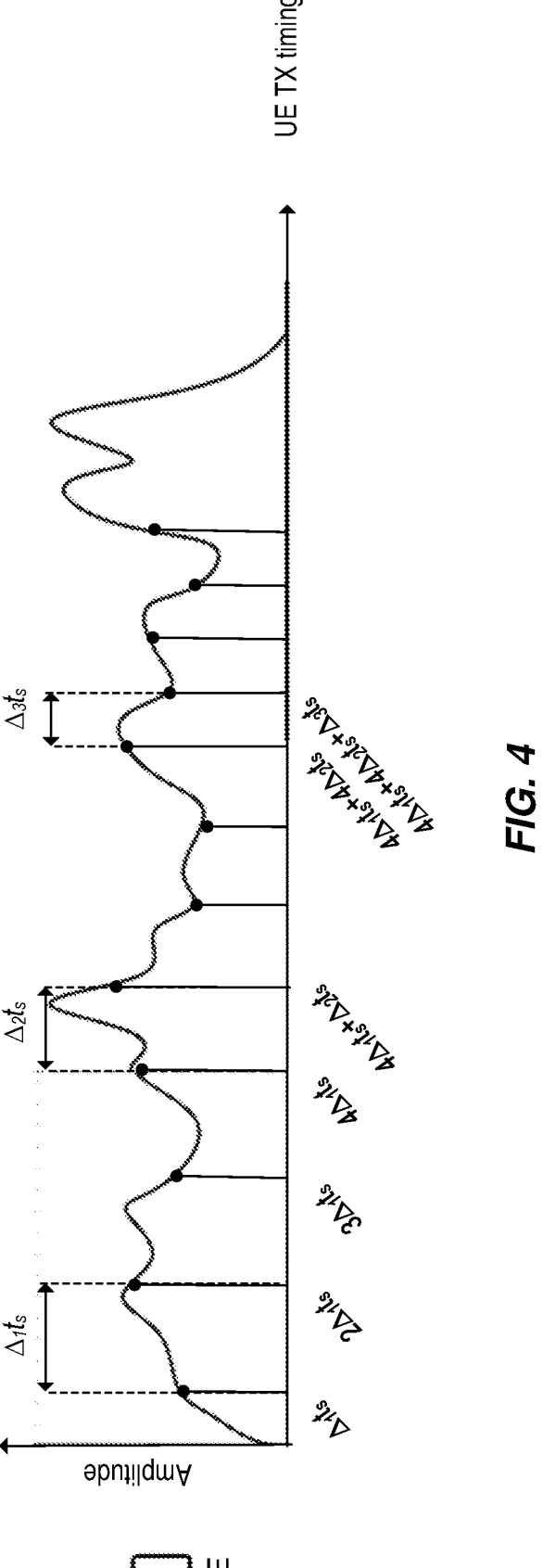
FIG. 4 illustrates how a UE can adjust its UL transmission timing resolution, i.e. sample rate $t_s$ at discrete time intervals to compensate for an increasing Doppler shift, in accordance with an embodiment of the present disclosure.

FIG. 4 illustrates an example where the UL transmission timing resolution, i.e. the sampling rate, of a UE transmit signal is adjusted every fourth sample, by factors $\Delta_1$, $\Delta_2$, and $\Delta_3$ to compensate for an increasing negative Doppler shift and increasing timing drift induced on a radio link due to a communications satellite moving away from a UE with increasing velocity. In other words, FIG. 4 illustrates how a UE can adjust its UL transmission timing resolution, i.e. sample rate $t_s$, at discrete time intervals to compensate for an increasing Doppler shift. Here the sampling rate is adjusted every fourth sample.

The adjustment of the sampling rate may take place in the frequency domain by using the following Fourier (F) transform time/frequency relation:

$$s(\alpha t_s) \overset{F}{\Leftrightarrow} \frac{1}{|\alpha|} S\left(\frac{\omega_s}{\alpha}\right)$$

where s is the signal represented in the time domain, S is the signal represented in the frequency domain, $t_s$ is the original sampling rate to be adjusted, $\omega_s$ is the frequency resolution (e.g., the subcarrier spacing), and a is the adjustment factor.

Figure 5:
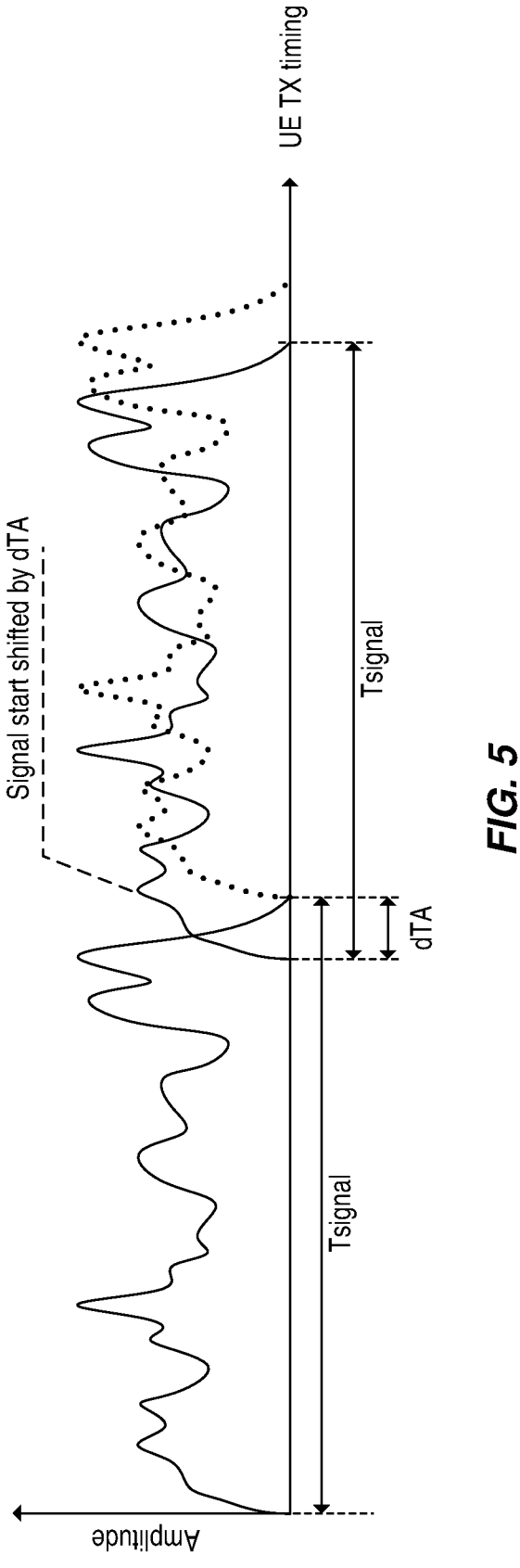
FIG. 5 illustrates how a UE can adjust its UL transmission timing by the adjusting the start time of a repeated signal by dTA to compensate for a satellite moving away from the UE during the Transmission Time Interval (TTI)

In one embodiment, the adjustment of the transmit timing is implemented as a shift of the transmission starting point, i.e. as a Timing Advance (TA). The transmission timing may be adjusted continuously or at specified time intervals within the TTI. FIG. 5 illustrates how a UE can adjust its UL transmission timing by the adjusting the start time of a repeated signal by dTA to compensate for a satellite moving away from the UE during the TTI. In other words, FIG. 5 shows an example where the transmission within a TTI is defined by a basic signal which is repeated once. The transmission timing is in this example advanced by dTA at the start of the repeated transmission to compensate for a satellite moving away from the UE. An unmodified version of the repeated transmission is shown as reference using a dashed line.

Figure 6:
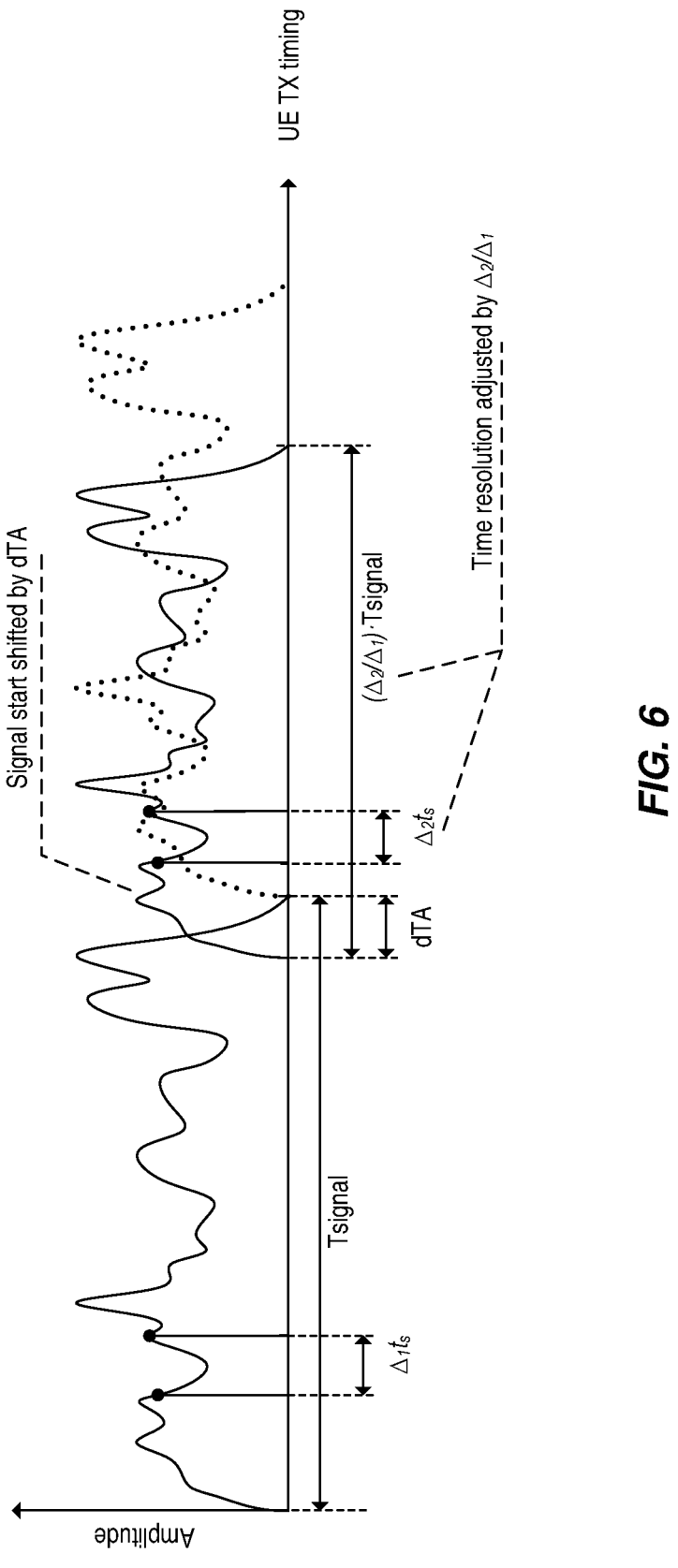
FIG. 6 illustrates how a UE can adjust its UL transmission timing by the adjusting the start time of a signal by dTA, and adjusting the time resolution of the repeated signal by $\Delta_1/\Delta_2$, in accordance with an embodiment of the present disclosure.

In yet another example, FIG. 6 shows a transmission defined by a basic signal which is repeated once. At the start of the repetition the transmission timing is adjusted by dTA to compensate for a satellite moving away from the UE, and the timing resolution is adjusted by $\Delta_2/\Delta_1$ to compensate for an increasing negative Doppler shift. An unmodified version of the repeated transmission is shown as reference using a dashed line. In other words, FIG. 6 illustrates how a UE can adjust its UL transmission timing by the adjusting the start time of a signal by dTA, and adjusting the time resolution of the repeated signal by $\Delta_1/\Delta_2$.

In regard to timing of step-wise time-frequency compensations, in one embodiment, the mentioned time-frequency corrections are performed at fixed time intervals within a TTI. These fixed time intervals within a TTI may, for example, be defined in a technical specification.

In one embodiment, the time-frequency corrections are performed at time intervals within a TTI determined by a network node and signaled to the transmitting UE. The signaling may be defined in the physical layer, e.g. in the Random Access Response (RAR) or a Downlink control Information (DCI) message. It may also be defined in the Medium Access Control (MAC) layer, or Radio Resource Control (RRC) layer. The signaling may broadcast signaling or UE-specific signaling.

The time interval may, e.g., define a periodicity so that the maximum timing error during any period with the TTI, defined by the aggregated timing drift during the period, irrespective of the satellite position, never exceeds a maximum threshold value, e.g. $\frac{1}{4}^{th}$ of a Cyclic Prefix (CP) duration.

Alternatively, the time and frequency compensation is performed at time instances within the TTI determined by when the aggregated timing drift equals or exceeds a threshold. Also, this threshold can be determined based on the CP duration, or a fraction thereof. In one example, the time and frequency compensation are performed as soon as the aggregated timing drift equals $\frac{1}{4}^{th}$ of the CP.

Instead of determining the mentioned time interval based on a tolerable timing error, a tolerable frequency error can be used as indication for determining the time interval.

To support these alternatives, the network and the UE need a mutual understanding of the time and frequency drifts. The network may determine the time drift based on measurements of the Doppler shift of the Physical Random Access Channel (PRACH) transmission of the UE (at the time of UE accessing the network), or calculations of the Doppler shift based on satellite ephemeris and UE position. The network may determine the frequency drift, i.e. the rate at which the Doppler shift changes (when the UE is in RRC Connected state), through calculations based on the satellite ephemeris (see [5]), or successive measurements of the Doppler shift of Physical Uplink Control Channel (PUCCH)/Physical Uplink Shared Channel (PUSCH) transmissions. The network may furthermore signal its estimation of the timing drift and frequency drift to the UE to support the mentioned mutual understanding, e.g. as mentioned in Technical Report (TR) 38.821 [2]. Alternatively, the UE may determine the time drift and frequency drift in a similar manner and signal its estimations to the network.

The length of the transmission segment between mentioned time intervals may be determined based on the satellite position or angle, carrier frequency or transmission frequency, or satellite elevation.

The time interval may be determined in terms of samples, symbols, slots, subframes, frames, or by a number of repetitions of a signal.

In regard to additional support for time-frequency compensations, in one embodiment, a UE may insert or create a time gap in the TTI of a UL transmission for performing the mentioned time-frequency corrections. The gap can, e.g., be defined by a delay of a second part of a signal as illustrated in FIG. 7, or alternatively by a set of an unused, dropped, muted, or punctured symbols in a transmission.

Figure 7:
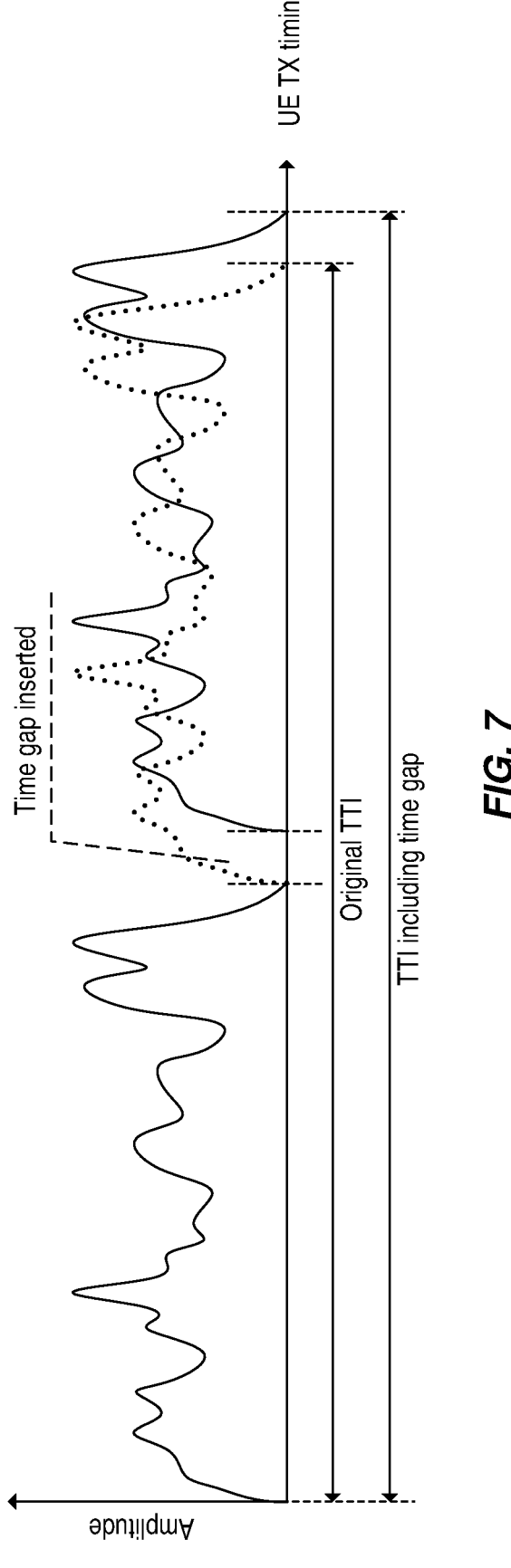
FIG. 7 illustrates the insertion of a time gap into a UL transmission by a UE to allow performance of time-frequency compensation in accordance with an embodiment of the present disclosure.

FIG. 7 illustrates a time gap inserted by a delay of a part of a signal.

The delay shown in FIG. 7 may also correspond to a correction of the UL transmit timing, where the transmit timing of the second part of the signal is delayed relative the first part to compensate for a case where the satellite is moving closer to the transmitting UE.

Time-frequency compensation may be performed during the inserted/created time gap. Some UEs may need such a time gap to be able to switch/adjust setting before continuing the transmission. Other UEs may be able to switch/adjust very quickly, but still, the time gap may be useful as guard period. As described below with reference to FIG. 8, a portion of a UL transmission may in some cases need to be muted to support a TA of a subsequent part of the UL transmission. Use of time gaps in which to perform time-frequency compensation may reduce the need to mute parts of the UL transmission.

Figure 8:
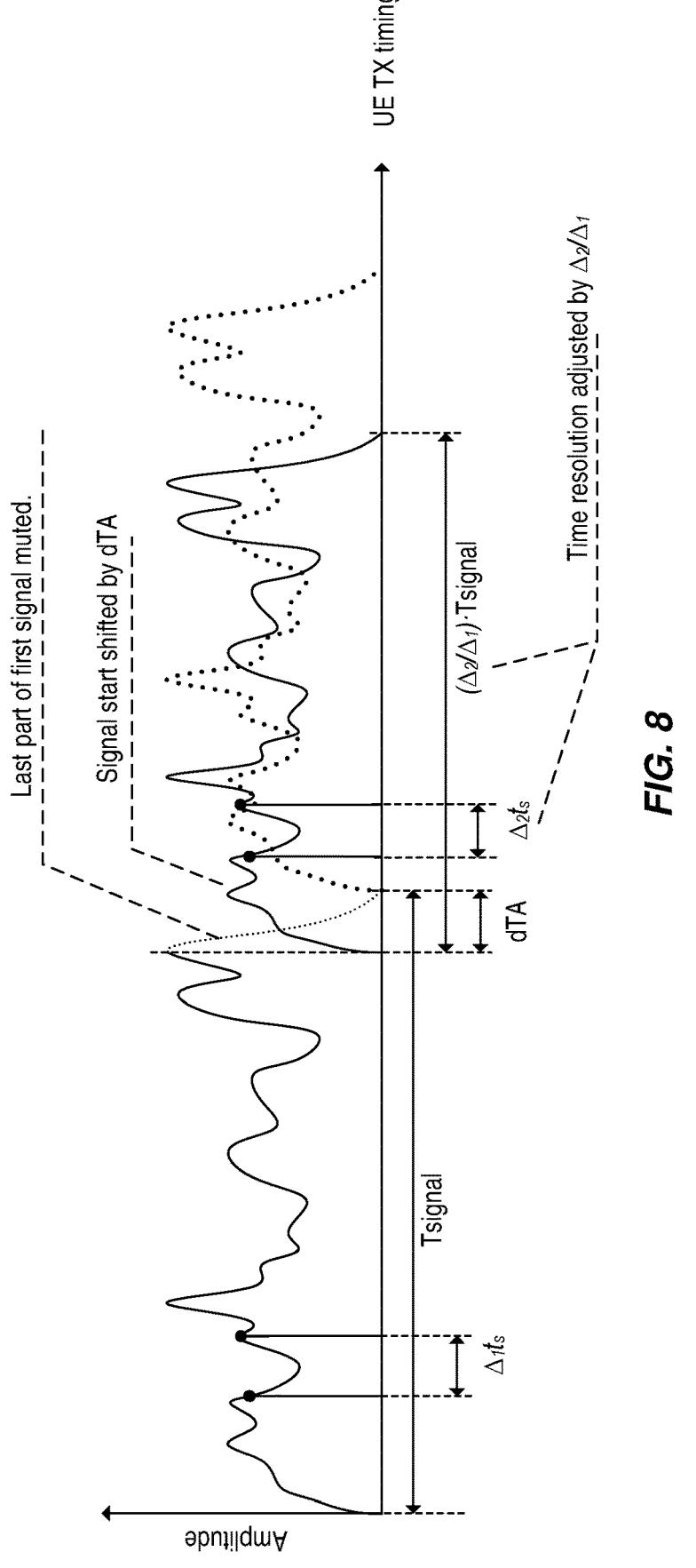
FIG. 8 illustrates muting of a portion of a UL transmission to support a Timing Advance (TA) of a subsequent part of the UL transmission in accordance with an embodiment of the present disclosure.

FIG. 8 shows how the last part of a first signal is muted to support the TA of a repeated signal first illustrated in FIG. 5 and FIG. 6. FIG. 8 illustrates how a UE can compensate its UL transmission timing by muting the final part of a first signal and then the adjusting the start time of a repeated signal by dTA and adjusting the time resolution of the repeated signal by $\Delta_2/\Delta_1$.

In one embodiment, a transmission gap is specified during which a UE can receive downlink (DL) transmissions allowing the UE to refine its time-frequency corrections.

The time gap may be determined in terms of samples, symbols, slots, subframes, or frames.

Figure 9:
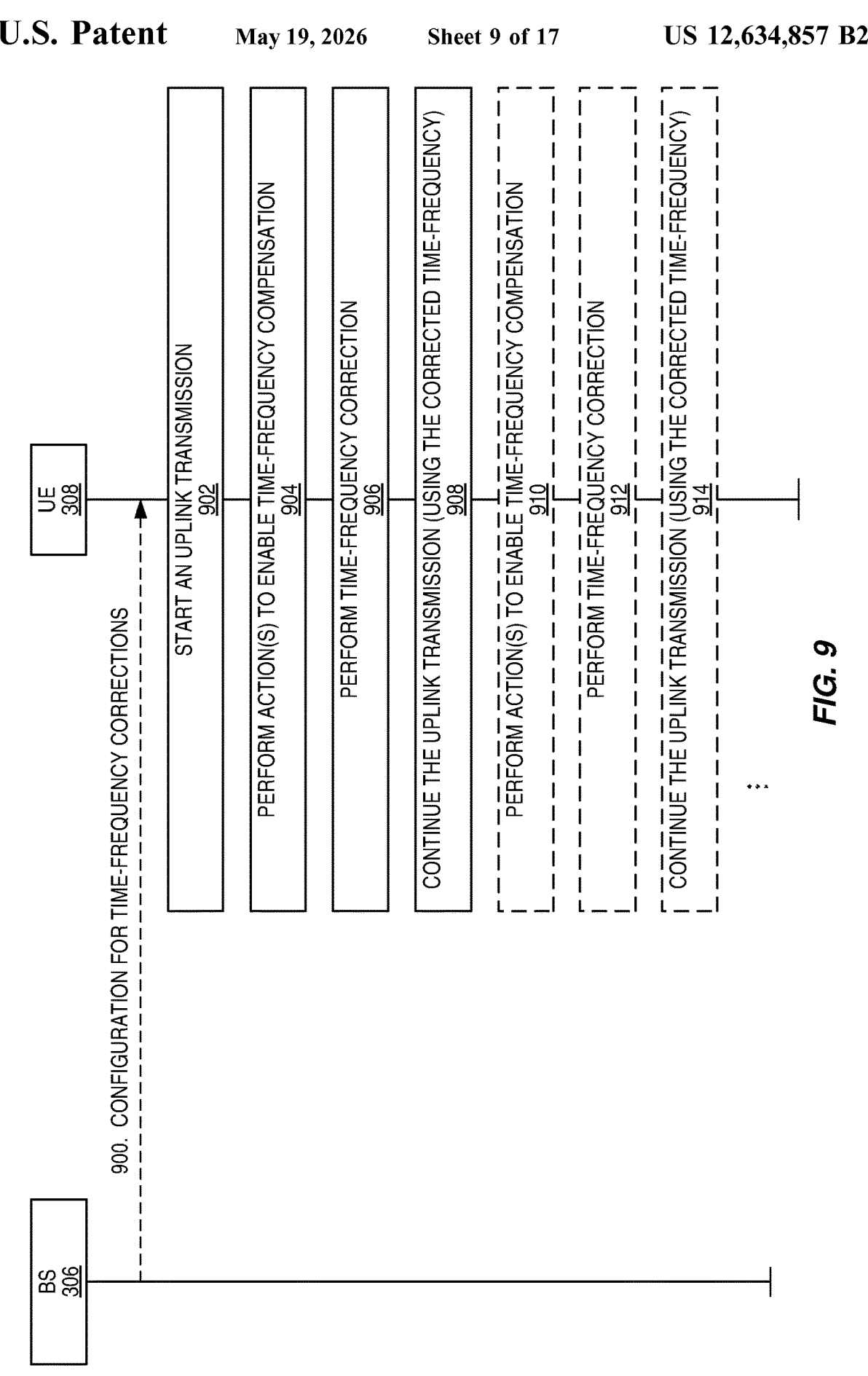
FIG. 9 illustrates the operation of a UE and a network node of the wireless communication system having the satellite-based Radio Access Network (RAN) of FIG. 3, in accordance with at least some of the embodiments described herein.

FIG. 9 illustrates the operation of the UE 308 and the BS 306 of the wireless communication system 300 having the satellite-based RAN of FIG. 3, in accordance with at least some of the embodiments described above. Note that optional steps are represented by dashed lines/boxes. As illustrated, optionally, the BS 306 provides, to the UE 308, a configuration that configures the UE 308 with one or more parameters that enable the UE 308 to perform time-frequency compensation according to any of the embodiments described herein (step 900). For example, in one embodiment, the configuration for time-frequency compensation either defines the locations of time gaps in a UL transmission or defines a parameter(s) that is(are) used by the UE 308 to derive the locations of the time gaps in a UL transmission. For example, the one or more parameters may indicate a time interval or periodicity or the time gaps, as described above. As another example, the one or more parameters may include the frequency drift, i.e. the rate at which the Doppler shift changes (when the UE 308 is in RRC Connected state). In another embodiment, the configuration for time-frequency compensation defines either when the UE 308 is to perform the time-frequency compensation during a UL transmission or defines one or more values to be used by the UE 308 to derive when to perform time-frequency compensation during a UL transmission.

The UE 308 starts a (e.g., scheduled) UL transmission (step 902). For example, the UL transmission may be a UL transmission that consists of multiple consecutive repetitions of a base transmission over a long TTI (e.g., up to four second TTI). Note that the term "base transmission" is used herein to refer to the transmission that is being repeated in each of the repetitions of the UL transmission. Also, when referring to a UL transmission consisting of multiple consecutive repetitions, the TTI of the UL transmission is the overall time period in which the repetitions are transmitted. This is to be distinguished from a TTI of a single repetition. For example, the UL transmission may be an NB-IoT transmission that includes multiple repetitions, an LTE or LTE-M transmission that includes multiple repetitions, or the like. Further, the base transmission may be, for example, a PUSCH or Narrowband PUSCH (NPUSCH).

During the UL transmission, the UE 308 performs one or more actions that include creating a time gap in the UL transmission during which the UE 308 is to perform time-frequency correction (see, e.g., FIG. 7) and/or muting a portion of the UL transmission to support a TA of the continued UL transmission (see, e.g., FIG. 8) (step 904). The UE 308 performs time-frequency correction (step 906). The UE 308 performs the time-frequency correction, or compensation, during a time period defined by performing the action(s) of step 904.

For example, if a time gap is created, the UE 308 performs one or more actions (e.g., delays the start of the remaining portion of the UL transmission) during the created time gap (see, e.g., FIG. 7). Note that the time gap is created during the TTI of the UL transmission. Also note that the TTI can have a length that is greater than 1 subframe, greater than 1 radio frame, greater than 1 millisecond (ms), greater than 10 ms, or greater than 1 second, and may be defined in any desired unit (e.g., number of symbols, number of slots, number of subframes, number of radio frames, or the like).

As another example, if a portion of the UL transmission is muted, the UE 308 performs one or more actions (e.g., advances the start of the remaining portion of the UL transmission) during the time period in which the UL transmission is muted (see, e.g., FIG. 8).

The UE 308 may perform the time-frequency correction in accordance with any of the embodiments described above. In some embodiments, performing the time-frequency compensation includes performing one or more actions to compensate for an estimated Doppler shift and/or an estimated change in Doppler shift, for example caused by motion of a satellite of a satellite-based RAN which is to receive the UL transmission (e.g., motion relative to the UE 308) and/or performing one or more actions to compensate for an estimated time dilation and/or an estimated change in time dilation, for example caused by motion of a satellite of a satellite-based RAN which is to receive the UL transmission (e.g., motion relative to the UE 308). For example, the UE 308 may adjust its UL transmit frequency to compensate for an estimated Doppler shift and/or change in Doppler shift, e.g., caused by the satellite velocity (e.g., relative to the UE 308). As another example, the UE 308 may additionally or alternatively adjust its UL transmit timing to compensate for the time dilation and/or change in time dilation caused by the satellite velocity (e.g., relative to the UE 308) by, e.g., adjusting the signal sample rate $t_s$, as described above. As another example, the UL transmit timing may be adjusted by shifting a starting point of the transmission of the remainder of the UL transmission (e.g., the starting point for continuing the UL transmission in step 908).

Note that computations employed by the UE 308 for the compensation may, for example, be performed in parallel to the UL transmission. So, those computations could for example be performed before creating a time gap or muting the UL transmission. Thus, computations used by the UE 308 to perform the time-frequency compensation may be computed in advance of the time gap/muting or performed in parallel with (i.e., during) the time gap/muting.

The UE 308 then continues the UL transmission using the corrected time-frequency (step 908). Sometime thereafter, the UE 308 performs one or more actions (e.g., create time gap or muting as described above) to enable further time-frequency compensation during the UL transmission (step 910). The UE 308 performs further time-frequency correction, e.g., during a time period defined by the performed action(s) in step 910 (step 912). The UE 308 then continues the UL transmission (step 914). The UE 308 may then continue this process until the UL transmission is completed.

Figures 10A, 10B:
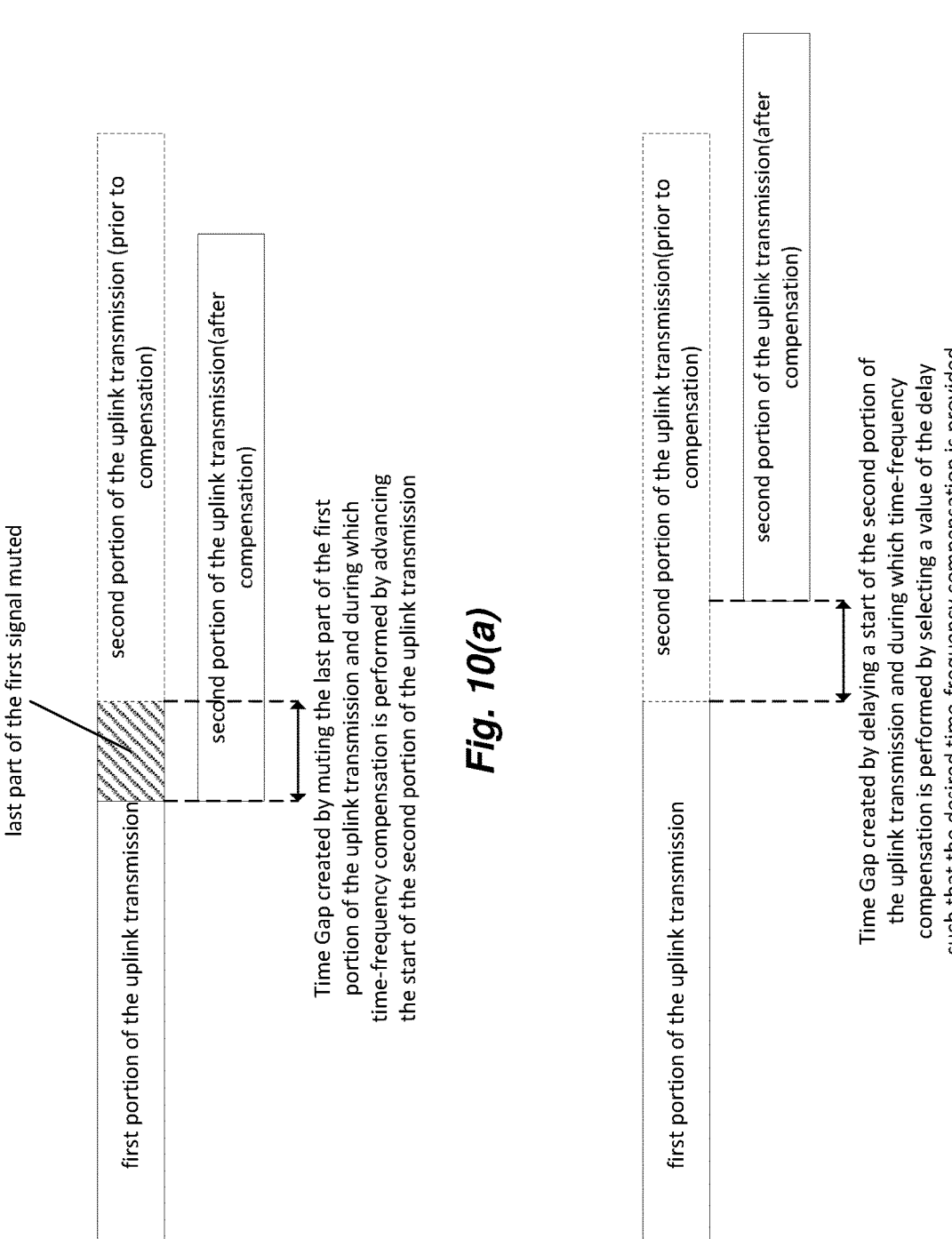
FIG. 10 further illustrates some aspects of embodiments of the present disclosure related to creating a time gap or muting the UL transmission to enable time-frequency compensation during the UL transmission.

FIG. 10 further illustrates some aspects of embodiments of the present disclosure related to creating a time gap or muting the UL transmission to enable time-frequency compensation during the UL transmission. Regarding the gaps/muting, two example scenarios are:

Scenario 1: A last part of a first portion of the UL transmission (signal) is muted and the start of the second portion of the UL transmission (signal) is advanced, as illustrated in FIG. 10(*a*). This can be seen as creating a time gap by muting of the last part of the first portion of the UL transmission. Thus, in this scenario, the UE can be seen as performing the following two steps: (1) creating a time gap that corresponds to the last part of the first portion of the UL transmission by muting the last part of the first portion of the UL transmission and (2) performing time-frequency compensation by shifting the start of the second portion of the UL transmission. FIG. 7 could be seen as a special case where the shift in the start of the second portion of the UL transmission is such that the start of the second portion of the UL transmission is aligned with the start of the created time gap (i.e., aligned with the start of the muted part of the first portion of the UL transmission).

Scenario 2: The start of the second portion of the UL transmission is delayed. In other words, a time gap is created by delaying the start of the second portion of the UL transmission. So, in this scenario, the UE 308 can be seen as performing the following two steps: (1) creating a time gap by delaying the start of the second portion of the UL transmission and (2) performing the time-frequency compensation by selecting a specific value for the delay of the start of the second portion of the UL transmission that gives the desired time-frequency compensation.

Figure 11:
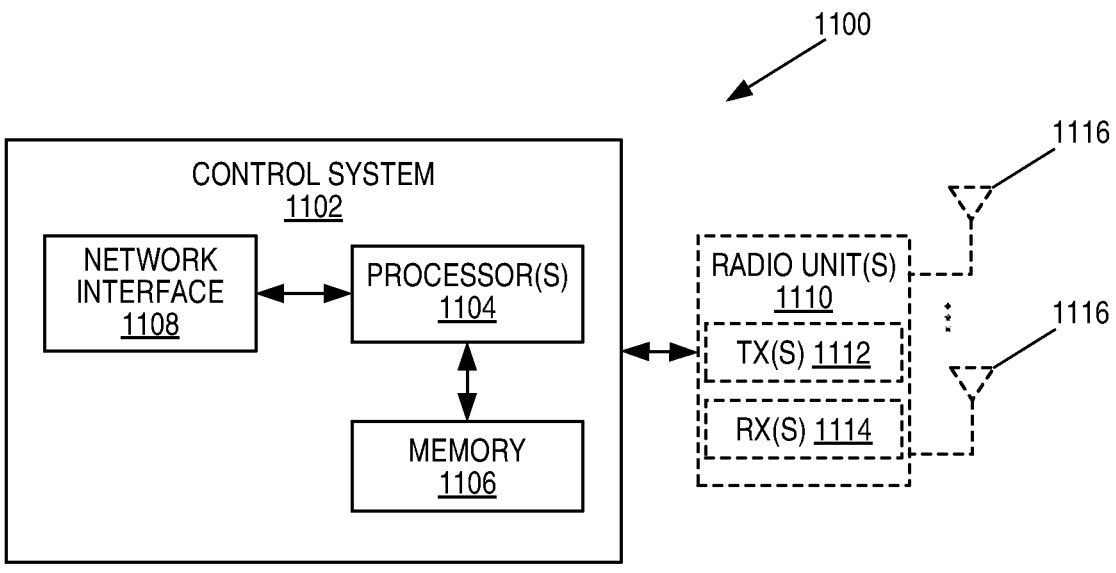
FIGS. 11 through 13 are schematic block diagrams of example embodiments of a network node.

FIG. 11 is a schematic block diagram of a network node 1100 according to some embodiments of the present disclosure. The network node 1100 may be, for example, the base station component 306 or a combination of the satellite 302 and the base station component 306. As illustrated, the network node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the network node 1100 may also include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a network node as described herein (e.g., one or more functions of the base station component 306, a combination of the satellite 302 and the base station component 306, as described herein). In some embodiments, the function(s) are implemented in software that is stored, e.g., in the memory 1106 and executed by the one or more processors 1104.

Figure 12:
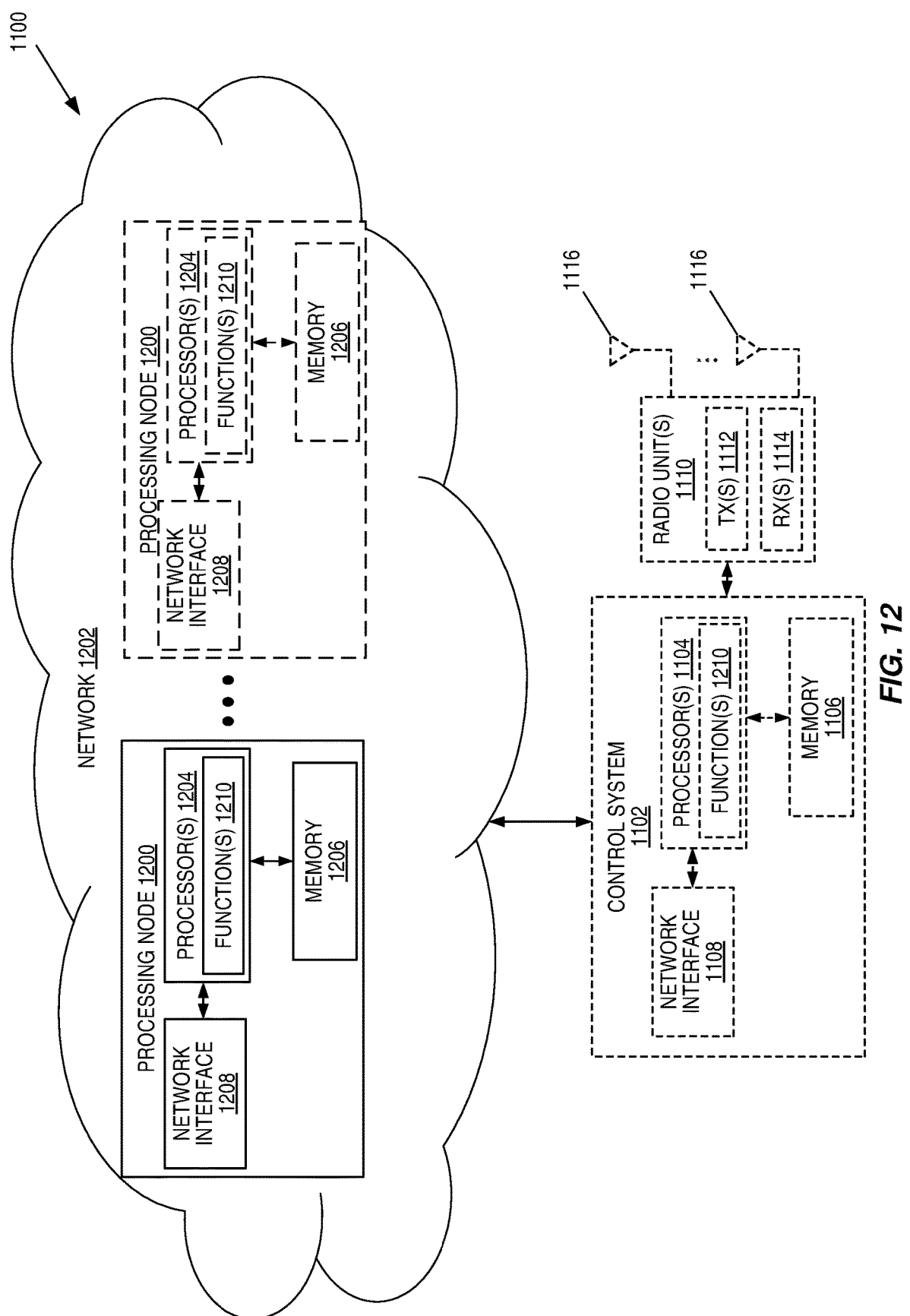

FIG. 12 is a schematic block diagram that illustrates a virtualized embodiment of the network node 1100 according to some embodiments of the present disclosure. As used herein, a "virtualized" network node is an implementation of the network node 1100 in which at least a portion of the functionality of the network node 1100 (e.g., one or more functions of the base station component 306 or a combination of the satellite 302 and the base station component 306, as described herein) is implemented as a virtual component(s) (e.g., via a virtual machine(s) executing on a physical processing node(s) in a network(s)). As illustrated, in this example, the network node 1100 includes one or more processing nodes 1200 coupled to or included as part of a network(s) 1202. Each processing node 1200 includes one or more processors 1204 (e.g., CPUs, ASICs, FPGAs, and/or the like), memory 1206, and a network interface 1208. In some embodiments, the network node 1100 may also include the control system 1102 and/or the one or more radio units 1110.

In this example, functions 1210 of the network node 1100 described herein (e.g., one or more functions of the base station component 306 or a combination of the satellite 302 and the base station component 306, as described herein) are implemented at the one or more processing nodes 1200 or distributed across the control system 1102 and the one or more processing nodes 1200 in any desired manner. In some particular embodiments, some or all of the functions 1210 of the network node 1100 described herein are implemented as virtual components executed by one or more virtual machines implemented in a virtual environment(s) hosted by the processing node(s) 1200. Notably, in some embodiments, the control system 1102 may not be included, in which case the radio unit(s) 1110 (if included) may communicate directly with the processing node(s) 1200 via an appropriate network interface(s).

In some embodiments, a computer program including instructions which, when executed by at least one processor, causes the at least one processor to carry out the functionality of network node 1100 or a node (e.g., a processing node 1200) implementing one or more of the functions 1210 of the network node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
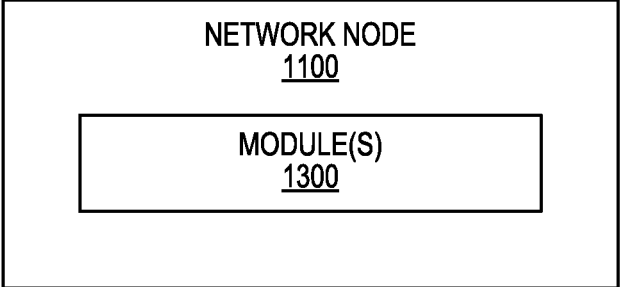

FIG. 13 is a schematic block diagram of the network node 1100 according to some other embodiments of the present disclosure. The network node 1100 includes one or more modules 1300, each of which is implemented in software. The module(s) 1300 provide the functionality of the network node 1100 described herein (e.g., one or more functions of the base station component 306, a combination of the satellite 302 and the base station component 306, as described herein). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
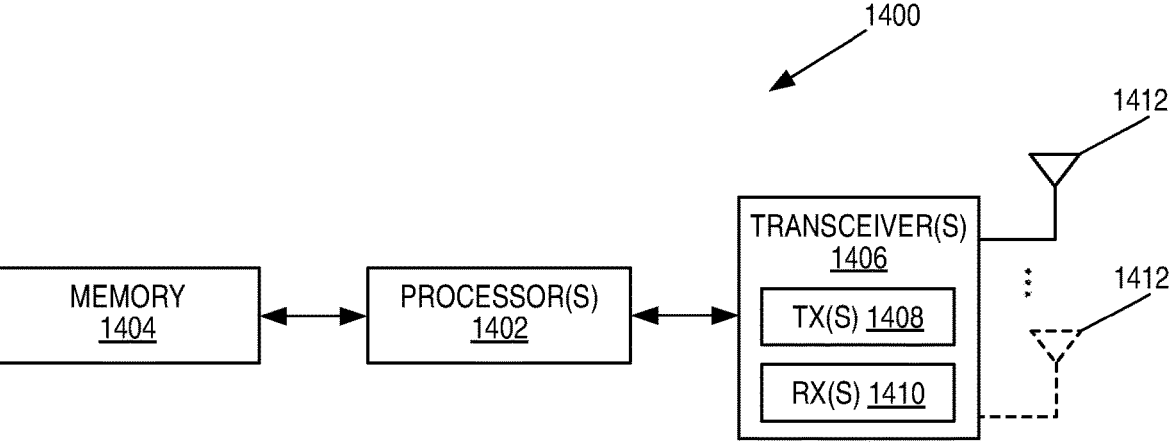
FIGS. 14 and 15 are schematic block diagrams of example embodiments of a UE.

FIG. 14 is a schematic block diagram of a UE 1400 according to some embodiments of the present disclosure. The UE 1400 may be, for example, the UE 308. The UE 1400 is one example of a wireless communication device. As illustrated, the UE 1400 includes one or more processors 1402 (e.g., CPUs, ASICs, FPGAs, and/or the like), memory

1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of a UE described above may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
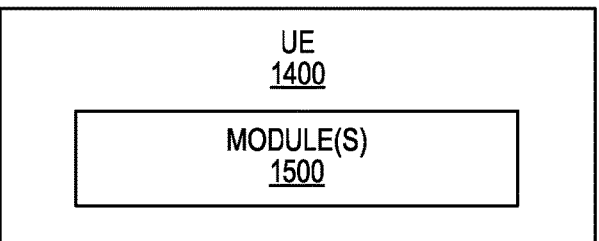

FIG. 15 is a schematic block diagram of the UE 1400 according to some other embodiments of the present disclosure. The UE 1400 includes one or more modules 1500, each of which is implemented in software. The module(s) 1500 provide the functionality of a UE as described herein.

Figure 16:
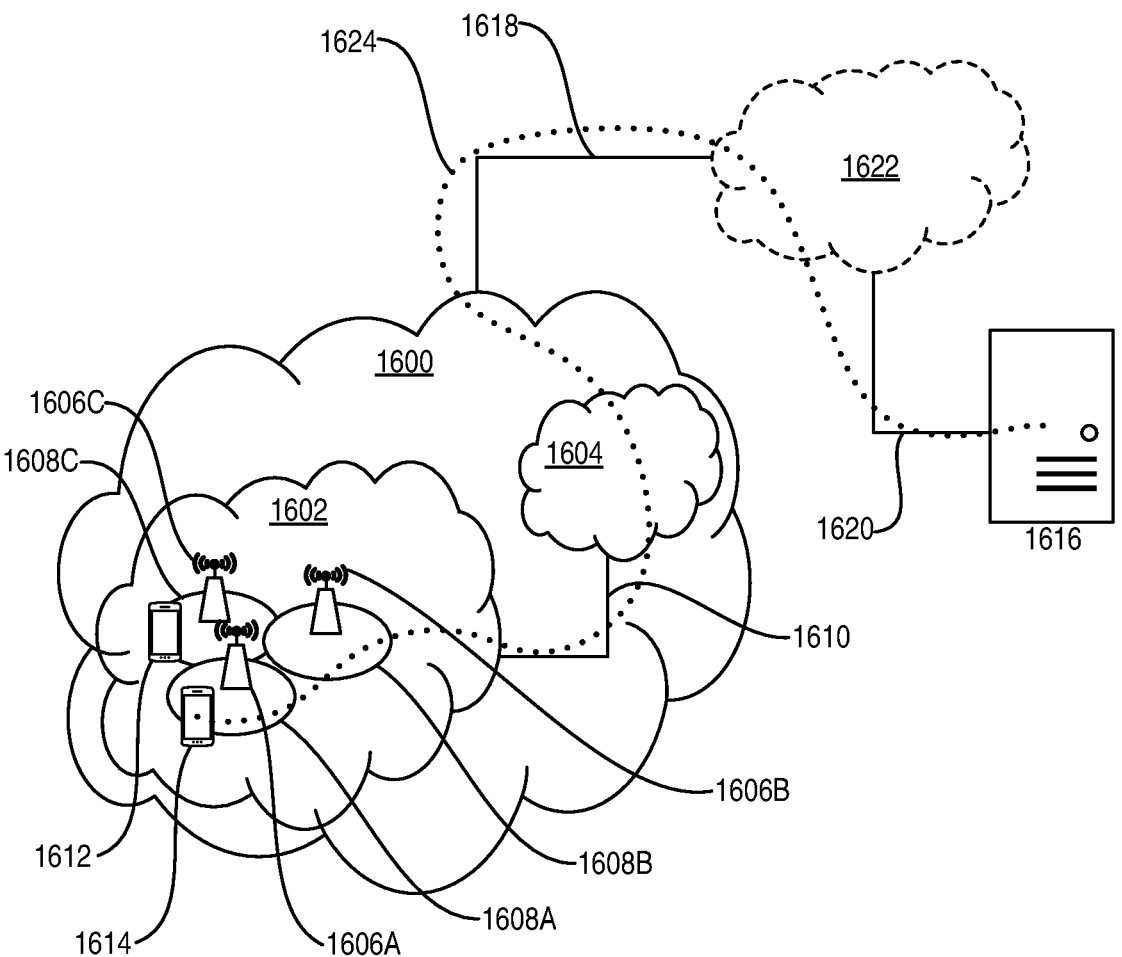
FIG. 16 illustrates an example embodiment of a communication system in which embodiments of the present disclosure may be implemented.

With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
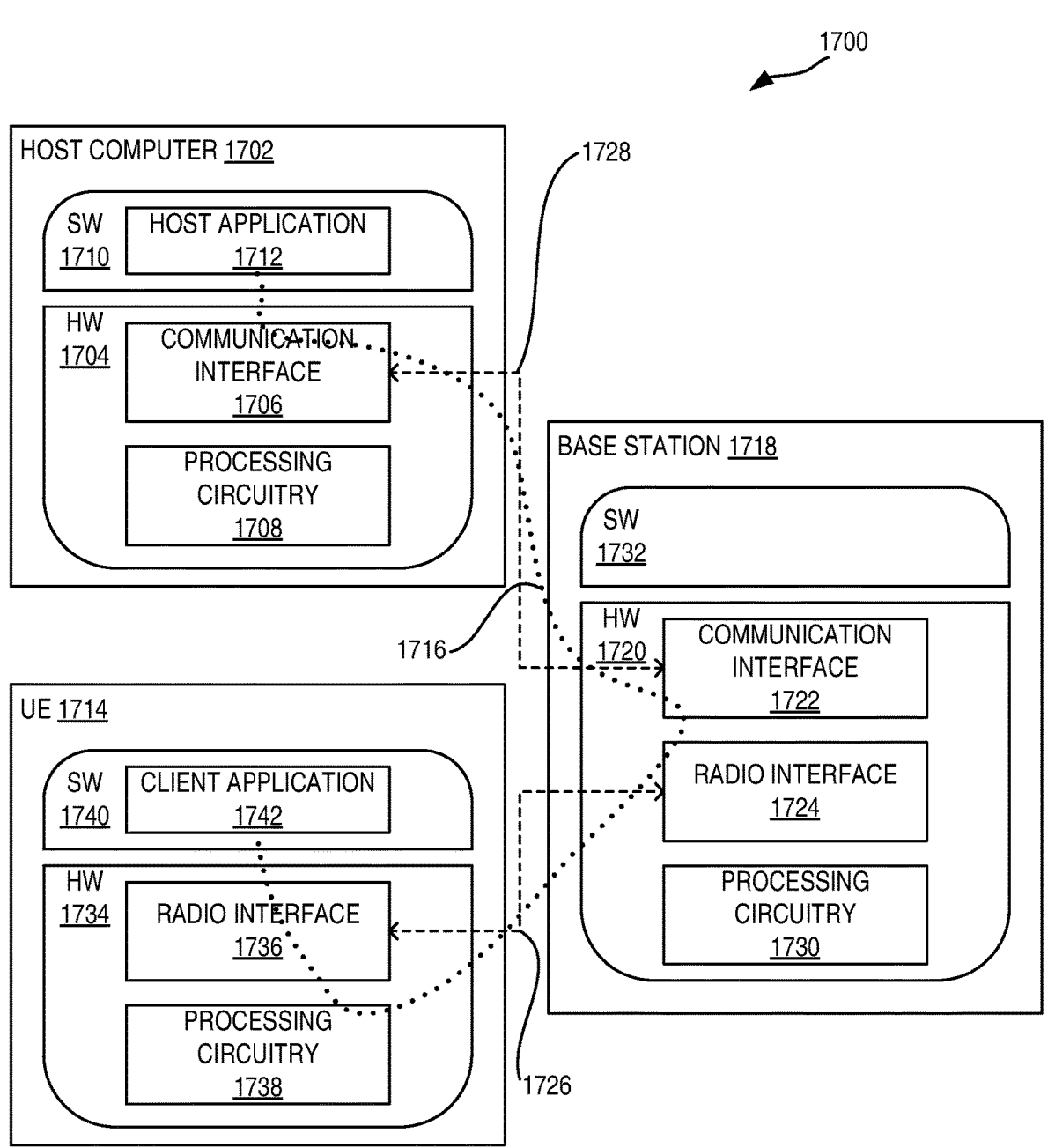
FIG. 17 illustrates example embodiments of the host computer, base station, and UE of FIG. 16.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

Figures 18, 19:
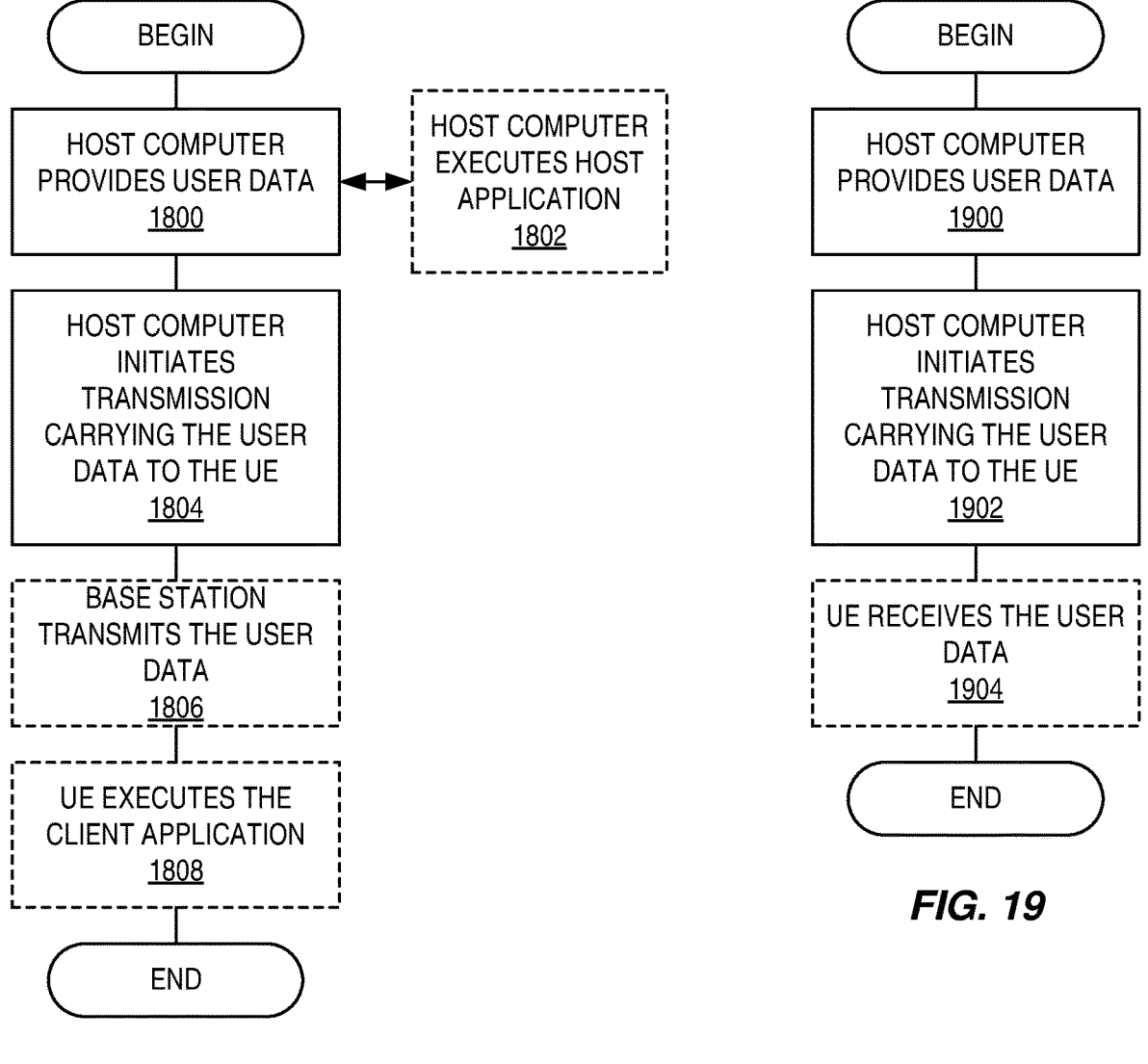
FIGS. 18 through 21 are flow charts that illustrate example embodiments of methods implemented in a communication system such as that of FIG. 16.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

Figures 20, 21:
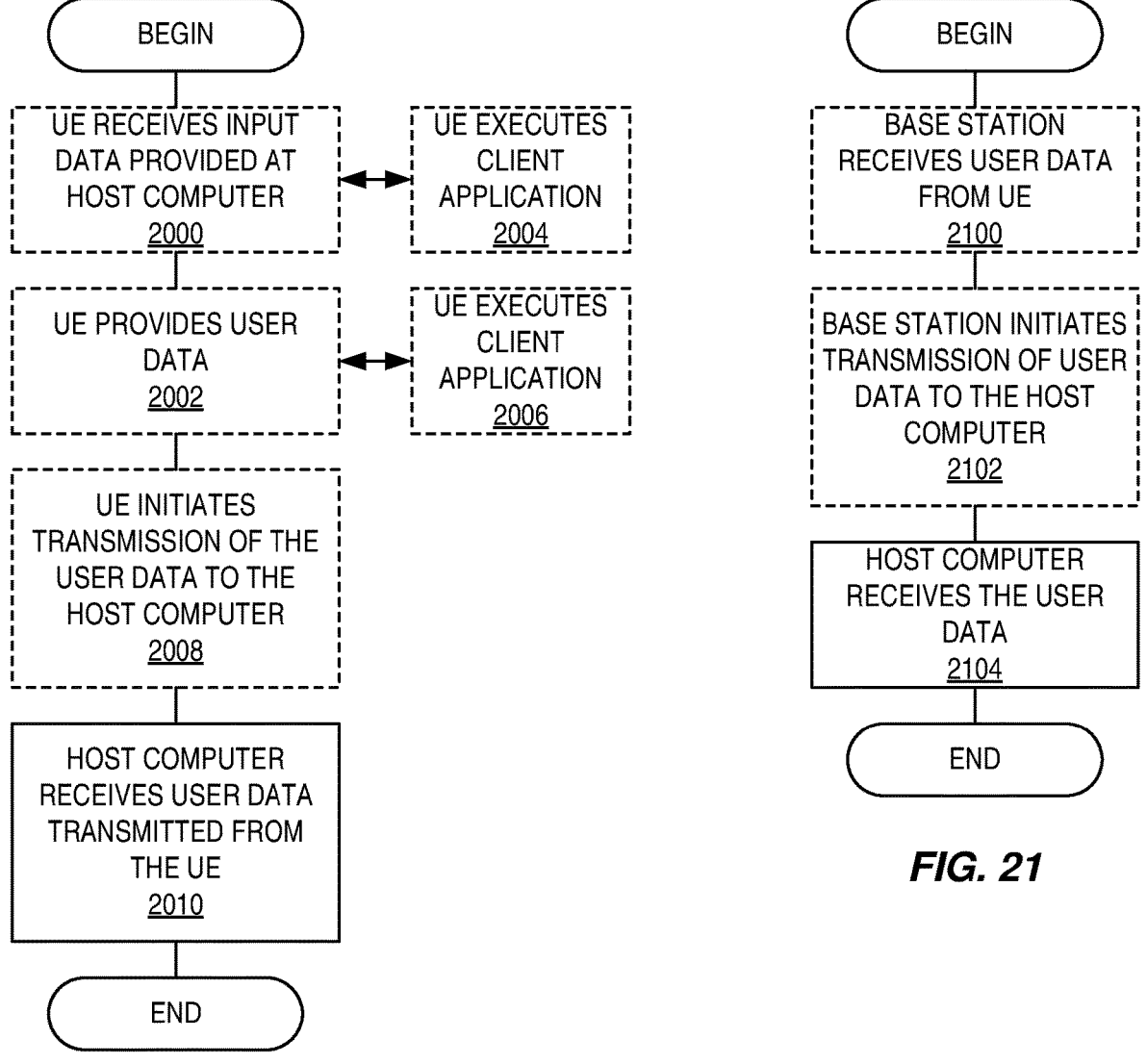

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device, the method comprising:
starting (902) an uplink transmission;
performing an action(s) (904) comprising:
    creating a time gap within the uplink transmission; and/or muting a portion of the uplink transmission to support a timing advance of the continued uplink transmission;

performing (906) time-frequency compensation; and continuing (908) the uplink transmission after performing the time-frequency compensation.

Embodiment 2: The method of embodiment 1 wherein performing (906) the time-frequency compensation comprises performing (906) the time-frequency compensation such that a time and/or frequency compensation is applied at the wireless communication device during a time period created by performing the action(s).

Embodiment 3: The method of embodiment 1 or 2 wherein the uplink transmission comprises a plurality of consecutive repetitions of a base transmission.

Embodiment 4: The method of embodiment 1 or 2 wherein the uplink transmission consists of a plurality of consecutive repetitions of a base transmission.

Embodiment 5: The method of embodiment 3 or 4 wherein the uplink transmission is an NB-IoT or LTE uplink transmission that comprises the plurality of consecutive repetitions of the base transmission.

Embodiment 6: The method of any one of embodiments 3 to 5 wherein the uplink transmission is an NB-IoT or LTE-M uplink transmission that comprises the plurality of consecutive repetitions of the base transmission.

Embodiment 7: The method of any one of embodiments 3 to 6 wherein the base transmission is a Narrowband Physical Uplink Shared Channel, NPUSCH.

Embodiment 8: The method of any one of embodiments 3 to 6 wherein the base transmission is a Physical Uplink Shared Channel, PUSCH, transmission.

Embodiment 9: The method of any one of embodiments 1 to 8 wherein performing the action(s) comprises creating (904) a time gap within the uplink transmission.

Embodiment 10: The method of embodiment 9 wherein creating (904) the time gap within the uplink transmission comprises creating (904) the time gap within a transmission time interval (TTI) of the uplink transmission.

Embodiment 11: The method of embodiment 10 wherein the TTI has a length of greater than 1 subframe, and/or greater than 1 radio frame, and/or greater than 1 ms, and/or greater than 10 ms, and/or greater than 1 second.

Embodiment 12: The method of any one of embodiments 1 to 11 wherein performing (906) the time-frequency compensation comprises: (a) performing one or more actions to compensate for an estimated Doppler shift, for example caused by motion of a satellite of a satellite-based radio access network which is to receive the uplink transmission; and/or (b) performing one or more actions to compensate for an estimated time dilation, for example caused by motion of a satellite of a satellite-based radio access network which is to receive the uplink transmission.

Embodiment 13: The method of any one of embodiments 1 to 12 wherein performing (906) the time-frequency compensation comprises adjusting a transmit frequency of the continued uplink transmission.

Embodiment 14: The method of embodiment 13, wherein the adjusting of the transmit frequency is performed to compensate for an estimated Doppler shift and/or estimated change in Doppler shift, for example caused by motion of satellite of a satellite-based radio access network which is to receive the uplink transmission.

Embodiment 15: The method of any one of embodiments 1 to 14 wherein performing (906) the time-frequency compensation comprises adjusting a time resolution and/or sampling rate of the continued uplink transmission.

Embodiment 16: The method of embodiment 15, wherein the adjustment of the time resolution and/or sampling rate is performed to compensate for an estimated time dilation and/or estimated change in time dilation, for example caused by motion of a satellite of a satellite-based radio access network which is to receive the uplink transmission.

Embodiment 17: The method of any one of embodiments 15 to 16, wherein the adjustment of the time resolution and/or sampling rate stretches or compresses the continued transmission in the time domain.

Embodiment 18: The method of any one of embodiments 1 to 17 wherein performing (906) the time-frequency compensation comprises adjusting an uplink transmit timing (e.g., timing advance) of the wireless communication device.

Embodiment 19: The method of embodiment 18, wherein the adjustment of the uplink transmit timing is performed to compensate for an estimated time dilation and/or estimated change in time dilation, for example caused by motion of a satellite of a satellite-based radio access network which is to receive the uplink transmission.

Embodiment 20: The method of any one of embodiments 1 to 19 wherein performing (906) the time-frequency compensation comprises shifting a starting point for a remainder of the uplink transmission.

Embodiment 21: The method of embodiment 20, wherein the shifting of the starting point is performed to compensate for an estimated time dilation and/or estimated change in time dilation, for example caused by motion of a satellite of a satellite-based radio access network which is to receive the uplink transmission.

Embodiment 22: The method of any one of embodiments 1 to 21 further comprising receiving (900) a configuration of one or more parameters from a network node, the one or more parameters defining a location(s) of time gap(s) to be created in the uplink transmission or one or more values to be used by the wireless communication device to derive the location(s) of the time gap(s) to be created in the uplink transmission.

Embodiment 23: The method of any one of embodiments 1 to 21 further comprising receiving (900) a configuration of one or more parameters from a network node, the one or more parameters defining when to perform the time-frequency compensation or one or more values to be used by the wireless communication device to derive when to perform the time-frequency compensation.

Embodiment 24: The method of any one of embodiments 1 to 23, wherein creating the time gap comprises: delaying a portion of the uplink transmission; and/or muting a portion of the uplink transmission; and/or puncturing a portion of the uplink transmission; and/or dropping one or more symbols of the uplink transmission; and/or not using one or more symbols of the uplink transmission; and/or leaving one or more symbols of the uplink transmission blank.

Embodiment 25: The method of any of the previous embodiments, further comprising: providing user data; and forwarding the user data to a host computer via the transmission to the base station.

Group B Embodiments

Embodiment 26: A method performed by network node (e.g., a base station), the method comprising configuring (900) a wireless communication device with one or more parameters that either: define locations of one or more time gaps to be used by the wireless communication device to perform time-frequency compensation during an uplink transmission; or define one or more values to be used by the wireless communication device to derive the locations of the one or more time gaps to be used by the wireless communication device to perform time-frequency compensation during the uplink transmission.

Embodiment 27: A method performed by a network node (e.g., a base station), the method comprising: configuring (900) a wireless communication device with one or more parameters that either: define when to perform the time-frequency compensation during an uplink transmission; or define one or more values to be used by the wireless communication device to derive when to perform time-frequency compensation during an uplink transmission.

Embodiment 28: The method of embodiment 26 or 27 wherein the uplink transmission comprises a plurality of consecutive repetitions of a base transmission.

Embodiment 29: The method of embodiment 26 or 27 wherein the uplink transmission consists of a plurality of consecutive repetitions of a base transmission.

Embodiment 30: The method of embodiment 28 or 29 wherein the uplink transmission is an NB-IoT or LTE uplink transmission that comprises of the plurality of consecutive repetitions of the base transmission.

Embodiment 31: The method of embodiment 28 or 29 wherein the uplink transmission is an NB-IoT or LTE-M uplink transmission that comprises the plurality of consecutive repetitions of the base transmission.

Embodiment 32: The method of any one of embodiments 28 to 31 wherein the base transmission is a Narrowband Physical Uplink Shared Channel, NPUSCH.

Embodiment 33: The method of any one of embodiments 28 to 31 wherein the base transmission is a Physical Uplink Shared Channel, NPUSCH.

Embodiment 34: The method of any one of embodiments 26 to 33 wherein one or more time gaps are created within a TTI of the uplink transmission.

Embodiment 35: The method of embodiment 34 wherein the TTI has a length of greater than 1 subframe, and/or greater than 1 radio frame, and/or greater than 1 ms, and/or greater than 10 ms, and/or greater than 1 second.

Embodiment 36: The method of any one of embodiments 26 to 35 wherein the location of the time gap(s) is(are) determined and/or when the time-frequency compensation is to be performed by the wireless communication device is(are) determined (e.g., by the base station or some other network node or system) based on satellite ephemeris and/or a cyclic prefix duration.

Embodiment 37: The method of any of the previous embodiments, further comprising: obtaining user data; and forwarding the user data to a host computer or a wireless device.

Group C Embodiments

Embodiment 38: A wireless device comprising: processing circuitry configured to perform any of the steps of any of the Group A embodiments; and power supply circuitry configured to supply power to the wireless device.

Embodiment 39: A base station comprising: processing circuitry configured to perform any of the steps of any of the Group B embodiments; and power supply circuitry configured to supply power to the base station.

Embodiment 40: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 41: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 42: The communication system of the previous embodiment further including the base station.

Embodiment 43: The communication system of the previous 2 embodiments, further including the UE, wherein the UE is configured to communicate with the base station.

Embodiment 44: The communication system of the previous 3 embodiments, wherein: the processing circuitry of the host computer is configured to execute a host application, thereby providing the user data; and the UE comprises processing circuitry configured to execute a client application associated with the host application.

Embodiment 45: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 46: The method of the previous embodiment, further comprising, at the base station, transmitting the user data.

Embodiment 47: The method of the previous 2 embodiments, wherein the user data is provided at the host computer by executing a host application, the method further comprising, at the UE, executing a client application associated with the host application.

Embodiment 48: A User Equipment, UE, configured to communicate with a base station, the UE comprising a radio interface and processing circuitry configured to perform the method of the previous 3 embodiments.

Embodiment 49: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 50: The communication system of the previous embodiment, wherein the cellular network further includes a base station configured to communicate with the UE.

Embodiment 51: The communication system of the previous 2 embodiments, wherein: the processing circuitry of the host computer is configured to execute a host application, thereby providing the user data; and the UE's processing circuitry is configured to execute a client application associated with the host application.

Embodiment 52: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 53: The method of the previous embodiment, further comprising at the UE, receiving the user data from the base station.

Embodiment 54: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 55: The communication system of the previous embodiment, further including the UE.

Embodiment 56: The communication system of the previous 2 embodiments, further including the base station, wherein the base station comprises a radio interface configured to communicate with the UE and a communication interface configured to forward to the host computer the user data carried by a transmission from the UE to the base station.

Embodiment 57: The communication system of the previous 3 embodiments, wherein: the processing circuitry of the host computer is configured to execute a host application; and the UE's processing circuitry is configured to execute a client application associated with the host application, thereby providing the user data.

Embodiment 58: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 59: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 60: The method of the previous embodiment, further comprising, at the UE, providing the user data to the base station.

Embodiment 61: The method of the previous 2 embodiments, further comprising: at the UE, executing a client application, thereby providing the user data to be transmitted; and at the host computer, executing a host application associated with the client application.

Embodiment 62: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 63: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 64: The communication system of the previous embodiment further including the base station.

Embodiment 65: The communication system of the previous 2 embodiments, further including the UE, wherein the UE is configured to communicate with the base station.

Embodiment 66: The communication system of the previous 3 embodiments, wherein: the processing circuitry of the host computer is configured to execute a host application; and the UE is configured to execute a client application associated with the host application, thereby providing the user data to be received by the host computer.

Embodiment 67: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 68: The method of the previous embodiment, further comprising at the base station, receiving the user data from the UE.

Embodiment 69: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core Network
5GS Fifth Generation System
AMF Access and Mobility Function
AP Access Point
ASIC Application Specific Integrated Circuit
AUSF Authentication Server Function
BL Bandwidth-Reduced Low-Complexity
CE Coverage Enhanced
CP Cyclic Prefix
CPU Central Processing Unit
DCI Downlink Control Information
DL Downlink
DSP Digital Signal Processor
eMBB Enhanced Mobile Broadband
eNB Enhanced or Evolved Node B
EPC Evolved Packet Core
EPS Evolved Packet System
FDD Frequency Division Duplexing
FPGA Field Programmable Gate Array
GEO Geostationary Earth Orbit
GHz Gigahertz
gNB New Radio Base Station
gNB-CU New Radio Base Station Central Unit
gNB-DU New Radio Base Station Distributed Unit
HSS Home Subscriber Server
IoT Internet of Things
kHz Kilohertz
km Kilometer
km/s Kilometer per Second
LEO Low Earth Orbit
LTE Long Term Evolution LTE-M Long Term Evolution for Machine Type Communication MAC Medium Access Control MAC-CE Medium Access Control Control Element MBB Mobile Broadband MEO Medium Earth Orbit MME Mobility Management Entity mMTC Massive Machine Type Communication ms Millisecond MTC Machine Type Communication NB-IoT Narrowband Internet of Things NEF Network Exposure Function NF Network Function NPUSCH Narrowband Physical Uplink Shared Channel NR New Radio NRF Network Function Repository Function NSSF Network Slice Selection Function NTN Non-Terrestrial Network NW Network OTT Over-the-Top PC Personal Computer PCF Policy Control Function P-GW Packet Data Network Gateway ppm Parts per Million ppm/s Parts per Million per Second PRACH Physical Random Access Channel PSS Primary Synchronization Signal PUCCH Physical Uplink Control Channel PUSCH Physical Uplink Shared Channel RAM Random Access Memory RAN Radio Access Network RAR Random Access Response RAT Radio Access Technology ROM Read Only Memory RRC Radio Resource Control RX Receive SCEF Service Capability Exposure Function SCS Subcarrier Spacing SMF Session Management Function SSS Secondary Synchronization Signal TA Timing Advance TDD Time Division Duplexing TR Technical Report TTI Transmission Time Interval TX Transmit UDM Unified Data Management UE User Equipment UL Uplink UPF User Plane Function URLLC Ultra-Reliable and Low Latency Communication Those skilled in the art will recognize improvements and modifications to the embodiments of the present disclosure. All such improvements and modifications are considered within the scope of the concepts disclosed herein.

REFERENCES

[1] TR 38.811, Study on New Radio (NR) to support non-terrestrial networks

[2] TR 38.821, Solutions for NR to support non-terrestrial networks

[3] RP-193234, Solutions for NR to support non-terrestrial networks (NTN), 3GPP RAN #86

[4] RP-193235, Study on NB-IoT/eMTC support for Non-Terrestrial Network, 3GPP RAN #86

[5] R1-1912725, On NTN synchronization, random access and timing advance, Ericsson, 3GPP RAN1 #99

[6] 3GPP TS 36.211 v16.0.0.

The invention claimed is:

1. A method performed by a wireless communication device, the method comprising:

receiving a configuration of one or more parameters from a network node of a non-terrestrial network, NTN, the one or more parameters defining a location of a time gap to be created in an uplink transmission or one or more values to be used by the wireless communication device to derive the location of the time gap to be created in the uplink transmission;

starting the uplink transmission;

creating the time gap within the uplink transmission;

performing an action during the time gap; and continuing the uplink transmission after performing the action;

wherein performing the action comprises adjusting a transmit frequency of the continued uplink transmission and/or adjusting an uplink transmit timing of the wireless communication device.

2. The method of claim 1 wherein the uplink transmission comprises a plurality of consecutive repetitions of a base transmission.

3. The method of claim 2 wherein the base transmission is a Narrowband Physical Uplink Shared Channel, NPUSCH.

4. The method of claim 1 wherein the uplink transmission is a Narrowband Internet of Things, NB-IoT, or Long Term Evolution, LTE, for Machine Type Communication, MTC, LTE-M, uplink transmission that comprises a plurality of consecutive repetitions of a base transmission.

5. The method of claim 1, wherein creating the time gap within the uplink transmission comprises creating the time gap within a Transmission Time Interval, TTI, of the uplink transmission, wherein the TTI has a length of greater than 1 subframe, greater than 1 radio frame, greater than 1 millisecond, greater than 10 milliseconds, or greater than 1 second.

6. The method of claim 1 wherein performing the action comprises adjusting the transmit frequency of the continued uplink transmissions to compensate for an estimated Doppler shift caused by motion of a satellite of a satellite-based radio access network which is to receive the uplink transmission.

7. The method of claim 1 wherein performing the action comprises adjusting the uplink transmit timing of the wireless communication device to compensate for an estimated time dilation caused by motion of a satellite of a satellite-based radio access network which is to receive the uplink transmission.

8. The method of claim 1, wherein creating the time gap comprises:

delaying a portion of the uplink transmission; and/or muting a portion of the uplink transmission; and/or puncturing a portion of the uplink transmission; and/or dropping one or more symbols of the uplink transmission; and/or not using one or more symbols of the uplink transmission; and/or leaving one or more symbols of the uplink transmission blank.

9. The method of claim 1 wherein the location of the time gap is based on satellite ephemeris and/or a cyclic prefix duration.

10. A wireless communication device comprising:
one or more transmitters;
one or more receivers; and
processing circuitry associated with the one or more transmitters and the one or more receivers, the processing circuitry configured to cause the wireless communication device to:
  receive a configuration of one or more parameters from a network node of a non-terrestrial network, NTN, the one or more parameters defining a location of a time gap to be created in an uplink transmission or one or more values to be used by the wireless communication device to derive the location of the time gap to be created in the uplink transmission;
  start the uplink transmission;
  create the time gap within the uplink transmission;
  perform an action during the time gap; and
    continue the uplink transmission after performing the action;
    wherein performing the action comprises adjusting a transmit frequency of the continued uplink transmission and/or adjusting an uplink transmit timing of the wireless communication device.

11. The wireless communication device of claim 10 wherein the uplink transmission comprises a plurality of consecutive repetitions of a base transmission.

12. The wireless communication device of claim 11 wherein the base transmission is a Narrowband Physical Uplink Shared Channel, NPUSCH.

13. The wireless communication device of claim 10 wherein the uplink transmission is a Narrowband Internet of Things, NB-IoT, or Long Term Evolution, LTE, for Machine Type Communication, MTC, LTE-M, uplink transmission that comprises a plurality of consecutive repetitions of a base transmission.

14. The wireless communication device of claim 10, wherein creating the time gap within the uplink transmission comprises creating the time gap within a Transmission Time Interval, TTI, of the uplink transmission, wherein the TTI has a length of greater than 1 subframe, greater than 1 radio frame, greater than 1 millisecond, greater than 10 milliseconds, or greater than 1 second.

15. The wireless communication device of claim 10 wherein performing the action comprises:-adjusting the transmit frequency of the continued uplink transmissions to compensate for an estimated Doppler shift caused by motion of a satellite of a satellite-based radio access network which is to receive the uplink transmission.

16. The wireless communication device of claim 10 wherein performing the action comprises adjusting the uplink transmit timing of the wireless communication device to compensate for an estimated time dilation caused by motion of a satellite of a satellite-based radio access network which is to receive the uplink transmission.

17. The wireless communication device of claim 10, wherein creating the time gap comprises:
  delaying a portion of the uplink transmission; and/or
  muting a portion of the uplink transmission; and/or
  puncturing a portion of the uplink transmission; and/or
  dropping one or more symbols of the uplink transmission; and/or
  not using one or more symbols of the uplink transmission; and/or
  leaving one or more symbols of the uplink transmission blank.

18. The wireless communication device of claim 10 wherein the location of the time gap is based on satellite ephemeris and/or a cyclic prefix duration.

* * * * *